(12) United States Patent  (10) Patent No.: US 8,800,054 B2
Mullin  (45) Date of Patent: Aug. 5, 2014

(54) SECURE SYSTEM AND APPARATUS FOR DATA DELIVERY

(75) Inventor: Terence J. Mullin, Tustin, CA (US)

(73) Assignee: Viridistor, LLC, Tustin, CA (US)

( * ) Notice: Subject to any disclaimer, the term of this patent is extended or adjusted under 35 U.S.C. 154(b) by 915 days.

(21) Appl. No.: 12/576,205

(22) Filed: Oct. 8, 2009

(65) Prior Publication Data

US 2010/0088772 A1  Apr. 8, 2010

Related U.S. Application Data

(60) Provisional application No. 61/103,801, filed on Oct. 8, 2008.

(51) Int. Cl.
*H04L 29/06* (2006.01)
*G06F 21/00* (2013.01)

(52) U.S. Cl.
USPC .............................................. 726/27; 705/51

(58) Field of Classification Search
None
See application file for complete search history.

(56) References Cited

U.S. PATENT DOCUMENTS

| | | | |
|---|---|---|---|
| 5,822,500 A | 10/1998 | Utsunomiya et al. | |
| 5,835,911 A | 11/1998 | Nakagawa et al. | |
| 5,936,542 A | 8/1999 | Kleinrock et al. | |
| 6,405,278 B1 | 6/2002 | Liepe | |
| 6,563,494 B1 | 5/2003 | Eichstaedt et al. | |
| 6,704,733 B2 | 3/2004 | Clark et al. | |
| 6,879,810 B2 | 4/2005 | Bouet | |
| 7,103,592 B2 | 9/2006 | Huret | |
| 7,212,983 B2 | 5/2007 | Redmann et | |
| 7,257,581 B1 | 8/2007 | Steele et al. | |
| 7,333,977 B2 | 2/2008 | Swaminathan et al. | |
| 7,668,885 B2 | 2/2010 | Wittke et al. | |
| 7,774,384 B2 | 8/2010 | Kortum et al. | |
| 7,822,866 B2 | 10/2010 | Doumuki | |
| 7,827,175 B2 | 11/2010 | Plow et al. | |
| 7,979,430 B2 | 7/2011 | Mullin | |
| 8,332,281 B2 | 12/2012 | Smith et al. | |
| 2002/0059363 A1* | 5/2002 | Katz et al. ..................... 709/203 |
| 2002/0068991 A1 | 6/2002 | Fitzsimmons, Jr. | |
| 2002/0087891 A1* | 7/2002 | Little et al. .................... 713/202 |
| 2002/0107027 A1 | 8/2002 | O'Neil | |
| 2002/0165630 A1 | 11/2002 | Arthur et al. | |
| 2003/0027634 A1 | 2/2003 | Matthews, III | |
| 2003/0041206 A1 | 2/2003 | Dickie | |
| 2003/0056131 A1 | 3/2003 | Eberhard et al. | |
| 2003/0105718 A1 | 6/2003 | Hurtado et al. | |
| 2003/0163622 A1* | 8/2003 | Moran ........................... 710/74 |
| 2003/0195833 A1 | 10/2003 | Baranowski | |
| 2004/0199631 A1 | 10/2004 | Natsume et al. | |
| 2004/0224703 A1 | 11/2004 | Takaki et al. | |
| 2005/0197859 A1 | 9/2005 | Wilson | |
| 2005/0246494 A1 | 11/2005 | Leon et al. | |
| 2006/0078859 A1 | 4/2006 | Mullin | |
| 2006/0173752 A1 | 8/2006 | Bowlus et al. | |

(Continued)

*Primary Examiner* — Gilberto Barron, Jr.
*Assistant Examiner* — Malcolm Cribbs
(74) *Attorney, Agent, or Firm* — Klein, O'Neill & Singh, LLP

(57) ABSTRACT

A system and apparatus for data delivery facilitates secure and controlled delivery of digital information, particularly in the context of an event, but also in the context of commercial and educational forums and the like. Preferably an administrator is positioned between parties wishing to share digital information and parties wishing to obtain such information. The administrator ensures that the digital information falls within certain security and formatting criteria so that parties may obtain the information without fear of damage to or abuse of their computing devices.

18 Claims, 17 Drawing Sheets

(56) References Cited

U.S. PATENT DOCUMENTS

| | | |
|---|---|---|
| 2006/0294235 A1 | 12/2006 | Joseph |
| 2007/0106754 A1 | 5/2007 | Moore |
| 2007/0124511 A1* | 5/2007 | Mullin ............................ 710/8 |
| 2008/0141381 A1 | 6/2008 | Walkoe et al. |
| 2008/0148056 A1 | 6/2008 | Ginter et al. |
| 2008/0209079 A1 | 8/2008 | Caswell |
| 2008/0312946 A1 | 12/2008 | Valentine et al. |
| 2009/0088088 A1 | 4/2009 | Caswell |
| 2011/0059772 A1 | 3/2011 | Want et al. |
| 2011/0270801 A1 | 11/2011 | Mullin |
| 2011/0307506 A1 | 12/2011 | Kass et al. |

* cited by examiner

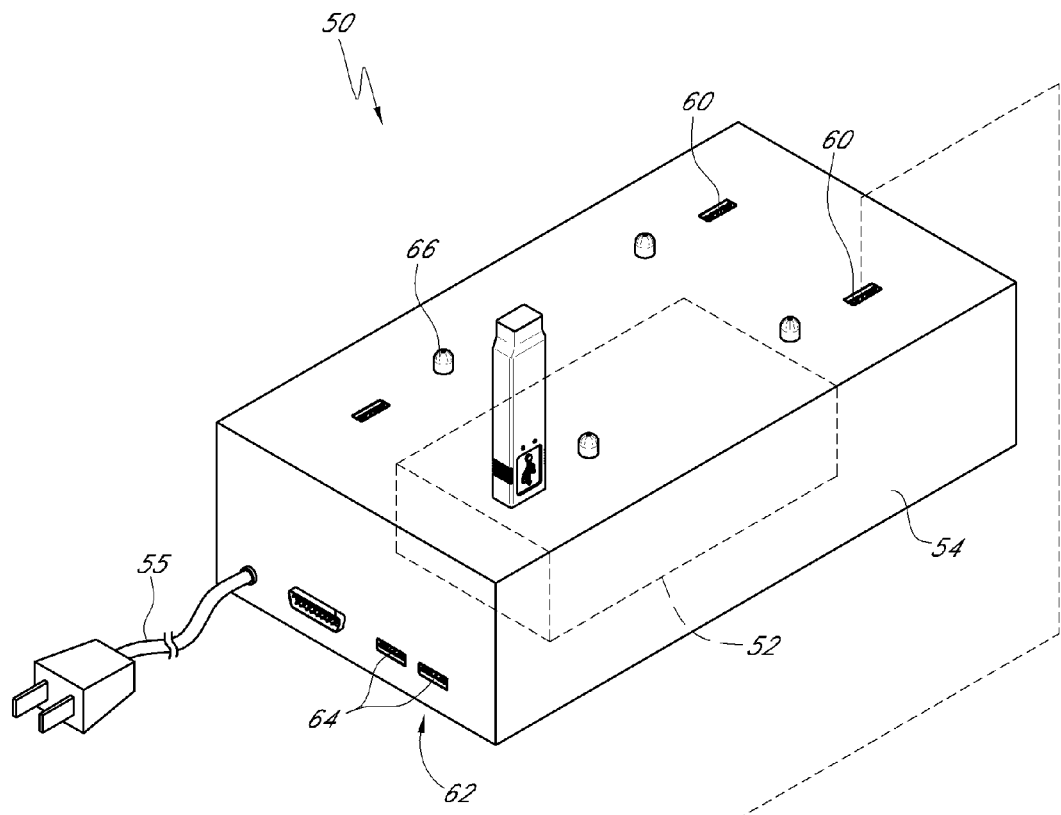
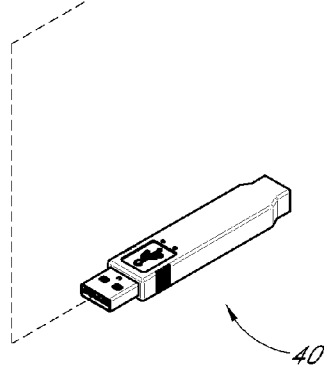
FIG. 1

FIG. 15

*Paperless Tradeshow 2010*

302

These are the Exhibitors that you visited. Click on a link to see the information for this Exhibitor.

332 →

ABC Co.
BCD Inc.
CDE Ltd.
DEF Plc.
EFG A.G.

Check to sort vendors by:

334 →

☐ Product Category 1
☐ Product Category 2
☐ Product Category 3
☐ Product Category 4

330

SECURE SYSTEM AND APPARATUS FOR DATA DELIVERY

CROSS-REFERENCE TO RELATED APPLICATIONS

This application claims the benefit of U.S. Provisional Application No. 61/103,801, which was filed on Oct. 8, 2008. The entirety of the priority application's specification and drawings is hereby incorporated by reference.

BACKGROUND OF THE INVENTION

1. Field of the Invention

The present invention is in the field of methods and apparatus for digital content delivery, and more particularly for regulated digital content delivery.

2. Description of the Related Art

Exhibitions, such as trade shows, are held regularly in many industries in order to provide exhibitors an opportunity to demonstrate their wares to potential purchasers. Exhibitors typically occupy a demonstration booth or the like from which they may present their products and/or services. Traditionally, exhibitors offer printed product literature and/or software-based materials such as CDs and DVDs having product information for interested parties to take in order to learn more about the exhibitor's products or services. Such product literature and materials tends to be expensive both to produce and to transport to and from the exhibition.

Exhibition attendees also face challenges with traditional literature collection. For example, an exhibition attendee who is interested in many different products can quickly accumulate several pounds of paper literature, software-based materials, and other media, which the attendee must lug around the exhibition and eventually transport home. Further, such accumulation of paper literature and other media tends to get jumbled up and disorganized. Thus, the attendee likely loses track of certain literature that was obtained during the exhibition. Further paper-based materials are not easily searched, and are not readily shared with colleagues absent manual photocopying and distribution. On the other hand, software-based DVDs and CDs are not readily organized.

Additionally, due to the fact that it is impossible to predict exactly how many attendees will choose to accept particular product literature, there is a tendency to over-order the amount of product literature that is necessary, resulting in substantial waste and cost. Further, even if product literature is accepted by attendees, such literature will, over time, become redundant or out-of-date, and must be disposed of, resulting in substantial environmental impact.

Similar concerns also arise in other contexts, whether it be distribution of materials in a formal or informal educational context, seminars or the like. Also, management of commercial literature, such as brochures and the like, requires attention and effort to ensure appropriate literature is kept up-to-date and available at appropriate locations.

SUMMARY OF THE INVENTION

Accordingly, there is a need for an effective and efficient system and method for exhibitors or other information distributors to provide product or other information to interested parties in a time efficient, inexpensive, and organized manner while minimizing waste.

Applicant's previous U.S. patent application Ser. No. 11/525,779, now U.S. Pat. No. 7,979,430, discloses a system and method for information exchange in which a computer selectively communicates with a portable electronic memory storage device. More specifically, in one embodiment, when the portable electronic memory storage device is engaged in a computer's interface port, the computer uploads one or more designated files to the portable storage device. In a trade-show iteration of this embodiment, instead of paper literature, a vendor can thus deliver product information in an electronic format to an interested party. This principle of the embodiments disclosed in the previous application can have applications in other fields, such as education, security, and general sales.

Upon further technology research and development, Applicant has developed a fuller appreciation of certain issues and opportunities, and has developed additional patentable improvements. For example, in any computing device there is a security risk, and Applicant has developed a structure and method that provides a secure data transfer device that nevertheless enables customization of data to be transferred. Also, management of a system for distribution of digital content at events such as trade shows and the like raise unique challenges for which Applicant has developed solutions.

In accordance with one embodiment, the present invention provides a secure system for data delivery, comprising a content delivery device comprising a computer enclosed within a housing. A secured access system for the content delivery device is configured to prevent unauthorized access to modify electronic files of the computer within the content delivery device, and comprises an authorization security software routine stored on the computer and configured so that the computer will not execute a command to modify electronic files of the computer or to download any electronic content from an external computer to the content delivery device computer unless requirements of the authorization security software routine are satisfied, and wherein upon satisfying the requirements of the authorization security software routine the external computer may download electronic content to the content delivery device computer. A plurality of electronic content files are saved in the content delivery device computer. The system also comprises a portable electronic memory storage device having a priority code stored therein. A data delivery interface is disposed on the content delivery device and is configured to selectively communicate with the portable electronic memory storage device. Software on the content delivery device computer is adapted to be triggered when the portable electronic storage device is engaged with the interface port and, upon triggering, to initiate a data delivery routine with the engaged portable electronic storage device. The data delivery routine is adapted to identify the profile code stored on the portable electronic memory storage device, determine which of the plurality of electronic content files correspond to the profile code, and upload to the portable electronic memory storage device only the electronic content file or files that correspond to the profile code.

In accordance with one such embodiment, no data from the portable electronic memory storage device is electronically saved in the memory of the secured content delivery device.

In another embodiment, an authorization code is stored on the portable electronic memory storage device, and the data delivery routine is adapted to search for and identify the authorization code. Further, the data delivery routine is adapted so that no electronic content files will be uploaded to the portable electronic memory storage device unless and until the authorization code is identified.

In one such embodiment, the content delivery device comprises a security code and the portable electronic memory storage device includes a security routine configured to read the security code, and the portable memory storage device will not allow electronic content files to be uploaded until the security routine has read the security code.

In another such embodiment, a preferred folder structure is saved on the portable electronic memory storage device, the data delivery routine is adapted to identify the preferred folder structure, and the data delivery routine is adapted so that no electronic content files will be uploaded to the portable electronic memory storage device unless and until the preferred folder structure is identified. In one such embodiment, the data delivery routine is adapted to upload the electronic content files to a selected folder of the preferred folder structure.

In still another embodiment, the content delivery device additionally comprises a setup interface, and the authorization security software routine can be accessed via the setup interface, but not via the delivery interface. In one such embodiment, the setup interface is disposed within the housing so that a physical barrier is disposed between the setup interface and the outside of the content delivery device housing. A further embodiment additionally comprises a security monitoring system configured to detect attempts to access the content delivery device computer.

In accordance with another embodiment the present invention provides a secure system for selectively delivering customized electronic data from a first party to a second party. The system comprises a system administrator and a content delivery device. The system administrator comprises an administrator computer. The content delivery device comprises a computer enclosed within a housing and an interface, the computer comprising a security system configured to limit access to change a setting of the computer and/or to delete or add an electronic file from or to the computer to the administrator computer. An electronic content file has information concerning a first party, the electronic content file being saved on the content delivery device computer. A portable electronic memory storage device is associated with a second party and has an authorization code saved therein, the portable electronic memory storage device configured to communicate with the content delivery device computer via the interface. The content delivery device computer is configured to read the authorization code of the portable electronic memory storage device and, upon verification of the authorization code, to upload the electronic content file to the portable electronic memory storage device. The content delivery device computer is also adapted to not save any data from the portable electronic memory storage device. Neither the first party nor the second party is the system administrator.

In accordance with another embodiment, the system comprises N first parties and at least N content delivery devices.

In another embodiment, the present invention provides a method for distributing a plurality of content delivery devices loaded with customized content. A desired content group for each of the content delivery devices is first uploaded to an administrator computer. Each content delivery device has a unique identification. The method includes creating a link between the content delivery device identification and a content group, and then connecting the content delivery device to the administrator computer. The administrator computer downloads the content group that has been linked to the particular content delivery device.

In one such embodiment, the administrator computer automatically downloads linked content to the delivery device upon detecting the delivery device.

In another embodiment, the method is performed in connection with an event such as a trade show, and the content delivery devices are loaded with content specified by associated exhibitors. In some such embodiments, the administrator computer monitors and regulates the content to ensure it complies with defined rules.

BRIEF DESCRIPTION OF THE DRAWINGS

FIG. 1 is a schematic illustration of a system and method in accordance with one embodiment.

FIG. 15 shows a screen shot from an attendee computer showing organization by exhibitor of information obtained during an event.

DETAILED DESCRIPTION OF PREFERRED EMBODIMENTS

Figure 2:
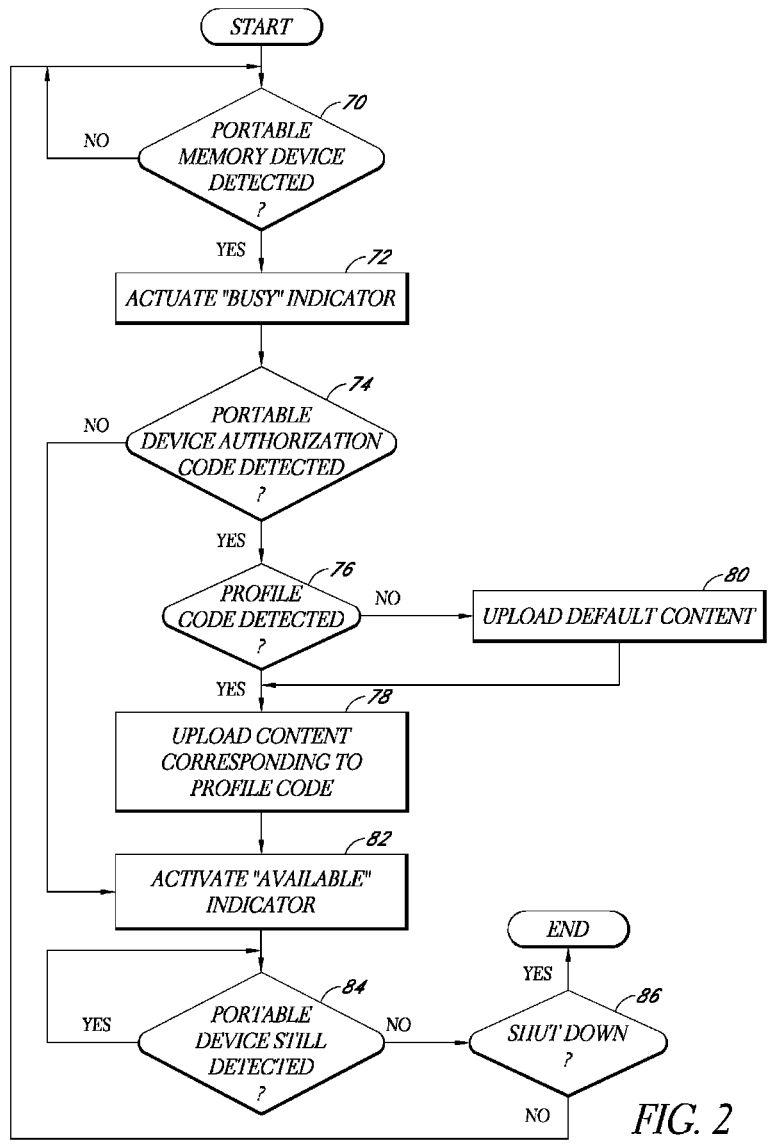
FIG. 2 is a flow chart depicting an interface of a portable electronic memory storage device with an exhibitor content delivery device according to one embodiment.

With initial reference to FIG. 1, an embodiment of a secure system and method for delivering customized information is presented. In order to aid presentation, the illustrated embodiment will be discussed in the context of a trade show in which an attendee, or user, is given a portable electronic memory storage device 40 for uploading electronic information from exhibitors, such as vendors. In one embodiment, the portable electronic memory storage device 40 comprises a USB-based memory device such as a "flash memory" drive or "thumb drive." Of course, it is to be understood that other types of portable electronic memory devices can be employed. For example, acceptable portable memory devices may include, without limitation, small card-based memory such as "compact flash" memory cards or "memory sheets," hand-held computers, such as personal digital assistants (PDAs), laptop and/or notepad computers, and other small portable electronic devices that have an electronic memory, such as an Apple® iPod®, cell phones, combination PDA and cell phone devices such as the Blackberry® or iPhone®, e-book reading devices such as the Kindle®, or other devices that can store digital files in data, audio, video, or other formats.

In the context of a trade show, exhibitors generally have demonstration booths, kiosks, or the like at which they present information about their products. The embodiment illustrated in FIG. 1 presents a secured content delivery device 50 that may be placed at or adjacent an exhibitor's booth. The content delivery device 50 preferably comprises a preprogrammed computing portion 52 which includes hardware such as a processor, a memory device such as a disk drive, solid state RAM, or the like, and includes software and/or firmware for running such hardware. A power cord 55 provides power for the device 50.

Preferably, the computing portion 52 of the content delivery device 50 is enclosed within a protective housing 54. The content delivery device 50 preferably also includes one or more interfaces 60, such as USB ports, that are in electronic communication with the computing portion 52. The interfaces 60 preferably are readily accessible, such as shown in FIG. 1, which depicts the interfaces 60 on a top of the housing 54. The illustrated content delivery device includes four interfaces 60, each of which is electronically linked to the computing portion 52. The illustrated device also has a connector section 62, which has one or more input connectors 64 for interfacing with an administrator computer. Preferably the connector section 62 is spaced from the interfaces 60 to avoid any confusion.

With continued reference to FIG. 1, preferably each trade show attendee is issued a portable electronic memory storage device 40 that is capable of interfacing with the exhibitor's content delivery device 50. In the illustrated embodiment, a thumb drive 40 is configured to fit into the USB port 60 of the delivery device 50 so as to interface with the delivery device 50.

In the embodiment illustrated in FIG. 1, a vendor/exhibitor booth has a content delivery device 50 set up at or adjacent the booth. The memory portion 52 of the exhibitor's delivery device 50 preferably includes content comprising one or more electronic files of product information such as product specifications, brochures, videos, instruction manuals, sales literature and the like concerning products displayed and/or demonstrated at the exhibitor's booth. Such files may be in any desired format. For example, in one embodiment, at least some of such files are ".pdf"-type files, others are ".jpg"-type files, and others are ".wav" files. Other formats can be used as desired and as appropriate. In some embodiments, multiple files can be configured to work together. For example, an executable or introductory file can display a menu guiding the user to select which file(s) most closely match his interest.

In some embodiments, one or more of the electronic files is actually a URL link to a web page dedicated to the corresponding product. Such linked web page preferably corresponds to the particular product. More preferably the web page is specifically tailored to trade show attendees, presenting the product in the same manner as at the trade show, including the same sales and discussion approach used at the trade show in order to take advantage of any buzz generated at the trade show and to maintain familiarity with the product identified by the attendee during the trade show. In one such embodiment, the linked web page is a hidden URL on the exhibitor's website, which hidden URL is accessible only by trade show attendees who uploaded the electronic file, and which is not available to the general public. In still another embodiment, rather than the linked web page being on the exhibitor's website, the web page may be hosted by the trade show administrator or a third party contracted to do so.

In an example of operation in accordance with one embodiment, if an attendee is interested in a product being demonstrated by the vendor, the attendee engages his portable memory device 40 with an interface 60 of the vendor's delivery device 50. Preferably, electronic product information files of the vendor are saved in the memory portion 52 of the vendor's content delivery device 50. When the attendee's portable memory device 40 is engaged with the content delivery device 50, the vendor's product information files preferably are automatically uploaded from the memory unit 52 to the attendee's portable device 40. Once the upload is complete, the attendee removes the device from the interface 60 and can continue browsing other booths of the exhibition, each of which has one or more of its own dedicated content delivery devices. Upon finding another interesting product at another vendor's booth, the user engages his portable memory device with the content delivery device of the chosen vendor, and thus obtains desired product information from the chosen vendor.

It is anticipated that each attendee will interface with multiple, even several, exhibitors during the course of a day or other specified time at the trade show. At the end of the show, or as desired, the attendee preferably engages the portable memory device 40 with the attendee's own computer, such as a laptop computer. The contents of the portable memory device, and specifically the product information uploaded from the exhibitor's content delivery device, is thus available to the attendee in electronic form and can be downloaded onto the attendee's computer, shared with others, or maintained on the portable device as desired by the attendee.

In the illustrated embodiment, an indicator 66 is provided adjacent each interface port 60. The indicator 66 informs the user when the content delivery device 50 is available for use and when data transfer to a portable device 40 is complete. In one preferred embodiment, the indicator 66 comprises two different-colored lamps, such as red and green LED lamps. The green LED lamp is illuminated when the associated port is available for use. When the attendee device 40 is engaged in the port 60, and content upload from the delivery device 50 to the portable device 40 begins, the red lamp is illuminated so as to indicate that the system is busy and that the portable memory device 40 should not be removed from the port 60. When upload is complete, the green lamp is again illuminated, indicating that the transfer is complete and the portable device 40 may safely be removed from the port 60. In one embodiment, when data upload is complete the green lamp flashes in order to prompt the attendee to remove the device. In other embodiments, different configurations of indicator lamps can be employed, such as green, yellow and red lamps. In one such embodiment, a green-glowing lamp indicates the interface is available, a yellow indicates that data transfer is in process, flashing green indicates transfer is complete, and red indicates that there is a technical problem.

In other embodiments, instead of or in addition to one or more lamps, other indicia, such as audible signals, can be used to signal completion of uploading. In still further embodiments, a screen associated with the content delivery device may instruct attendees how and when to engage their portable device with the delivery device, will inform regarding status during information transfer, and will instruct the attendee when to remove the portable device.

In the embodiment just discussed, electronic content that is stored in the memory 52 of the content delivery device 50 is uploaded to the user's portable memory device 40. Notably, in this embodiment the content delivery device 50 is a standalone device that does not require interaction or support from any other computing device during operation. Preferably, the content delivery device 50 is a secured device that is configured to resist hacking or other intrusion from any party other than the party responsible for the device.

In the context of a trade show, the trade show administrator, not the exhibitor, is responsible for loading and managing content on the device. Such an administrator can, in some embodiments, be the organizer in overall charge of the trade show, or may be a third party engaged to manage at least the content delivery aspects of the trade show. Preferably, the administrator has the ability to access the content delivery device, but the exhibitor preferably does not have security access to the device, and must rely upon the administrator to load the exhibitor's own electronic content onto the device for subsequent upload to trade show attendees. This security arrangement gives the administrator control of content delivery so as to ensure consistency between exhibitors and avoid the possibility that viruses and other undesirable computer files will be proliferated by the trade show's own content delivery devices.

Further, the secured nature of the content delivery device 50 enables the administrator to maintain strict control over the size and configuration of exhibitor files. Without strict control over files an uncontrolled exhibitor, for example, may arrange to upload many large files that would essentially fill the memory of the user's portable electronic memory device 40, thus excluding the user from being able to upload competing exhibitors' product materials. Also, maintaining tight security on the content delivery device 50 enables the administrator to prevent modification of the device in undesirable ways such as, for example, for the device not only to upload electronic content to a user's portable memory device 40, but also to download information from the portable device 40 that may be personal/private information concerning the user or owner of the portable electronic memory device, or to delete or otherwise affect information of other exhibitors that an attendee may have already uploaded. Further requiring all files to be submitted to the administrator in order to qualify for upload to attendee devices ensures that exhibitors cannot be anonymous, but are accountable for any such content.

In order to ensure a secure computing and data transfer environment, preferably the content delivery device 50 and the user's portable electronic memory device 40 are each configured to maintain such security and access control. More specifically, not only may a vendor not have access to the content delivery device, but preferably an authorization code is disposed on the user's portable device, and the content delivery device is configured to first look for and identify the authorization code before commencing any data transfer from the delivery device to a portable device.

In trade shows and in other professional events, not all attendees or users have the same or similar preferences when it comes to the detail or format of information they desire. For example, a trade show attendee whose employment is mostly in sales may wish for an entirely different type of product information than a trade show attendee whose main job focus is in research and development. Specifically, a salesman may wish to have a summary of a product's abilities and advantages, while a research and development engineer may desire detailed specifications and other technical aspects of a product in order to evaluate how the product may fulfill his needs or interact with his own product. Previously, in order to accommodate such varied informational needs, the vendor had to prepare a broad variety of printed materials for distribution at the trade show. Of course, the broader the variety of materials to be prepared and taken to the trade show, the greater the expense and waste in producing, printing, transporting, and disposing of the materials. However, product materials can be distributed in an electronic format for comparatively little expense.

Accordingly, in one embodiment, preferably the user's portable electronic memory storage device is configured with a profile code in addition to the authorization code. The profile code preferably indicates certain preferences of the user. For example, a profile code for a user who is a salesman would indicate a preference for sales-related materials, while a profile code for an attendee who is a research and development engineer may indicate a preference for detailed product specifications. It is to be understood that many types and levels of profile codes can be employed as desired. For example, in another embodiment, a profile code can indicate a user's language preference.

In one preferred embodiment, preferably a portable electronic memory device 40 is prepared for each attendee, and the device includes the profile code indicative of the particular attendee's content preferences. Moreover, preferably the content delivery devices are configured to not only read the authorization code before authorizing any data transfer to the portable device, but also to read the profile code, and select electronic content to upload to the portable device based upon the profile code.

With reference next to FIG. 2, a flow diagram is presented showing one embodiment of an interaction between a vendor's content delivery device 50 and a user's portable memory storage device 40. Upon start of the routine, the software monitors 70 the port 60 of the delivery device 50 to determine whether a portable memory device 40 has been engaged. Once engagement of an attendee device 40 is detected, preferably an indicator 66 is actuated 72 to indicate that data transfer is proceeding and to prompt the attendee to not remove the portable device.

The content delivery device 50 preferably searches for and determines 74 whether the authorization code has been detected. If the code is not detected, then no data transfer takes place, and the user preferably is prompted 84 to remove the memory device 40 from the port 60. However, if the authorization code is detected, the content delivery device then searches for a profile code. Once such a profile code is identified 76, the content delivery device 50 uploads 78 electronic content corresponding to that profile code to the user's portable memory storage device 40. Preferably, profile codes are stored within the content delivery device, and there is a correspondence between each profile code and the content to be delivered when such a code is identified. In some embodiments, the steps of identifying 74 the authorization code and identifying 76 the profile code can be combined or performed in another order. In further embodiments, each portable memory storage device has only a single profile code to indicate all of the preferences of the user. In other embodiments, however, a different profile code may be employed to indicate each type of preference of a particular user.

In the illustrated embodiment, if the content delivery device searches for but cannot identify 76 a profile code, the content delivery device preferably uploads 80 a default electronic content that corresponds to no particular code. In embodiments enabling profile codes in each of a plurality of categories, each category preferably has a default electronic content in case the user does not indicate a preference in that category.

Once data delivery is complete, another indicator is actuated 82 to indicate that the data transfer is complete and the attendee device may be removed. The content delivery device 50 preferably continues to monitor 84 the port 60 to determine whether the memory device 40 has been removed, and once the device 40 has been removed from the port, the content device returns to the beginning of the process unless the system has been prompted to shut down 86. Upon shut down of the system, of course, the process ends.

In the just-described routine, not only is security maintained by information transfer taking place only between authorized devices, but the content delivered has been customized to a profile and preferences of the user. Further, preferably no data from the portable memory device is saved in the memory of the content delivery device. As such, there is no risk that corrupted or malicious files that may be on the portable device will infect the content delivery device. In one embodiment, the content delivery device 50 is configured so that it will not accept any input writing from any device engaged in the ports 60, but only from devices engaged in connectors 64 of the connector section 62, and then only if security routines are satisfied. In another embodiment, any port 60, 64 can be used for the administrator to connect to and write to the delivery device 50, so long as security routines are satisfied as will be discussed in more detail below.

As discussed above, preferably the administrator is responsible for the security of the content delivery device. As such, the administrator checks the content to ensure it meets certain criteria, upkeeps, and installs the content onto the device. Preferably the content delivery device has a security system configured so that only the administrator can access the content delivery device in order to change computer settings or software and delete or add files.

The illustrated embodiment contemplates a content delivery device dedicated to a single product. It is to be understood that, in other embodiments, a single content delivery device can manage information for plural products. In one embodiment an actuator such as a button, touch-screen or the like is provided so that the attendee can choose one or more products of interest upon or prior to engaging his portable memory device with the content delivery device. In embodiments in which a touch-screen is provided, such a touch-screen can be embedded into the device 50 or may be connected via cable to an input/output connector of the input section 62.

Figure 3:
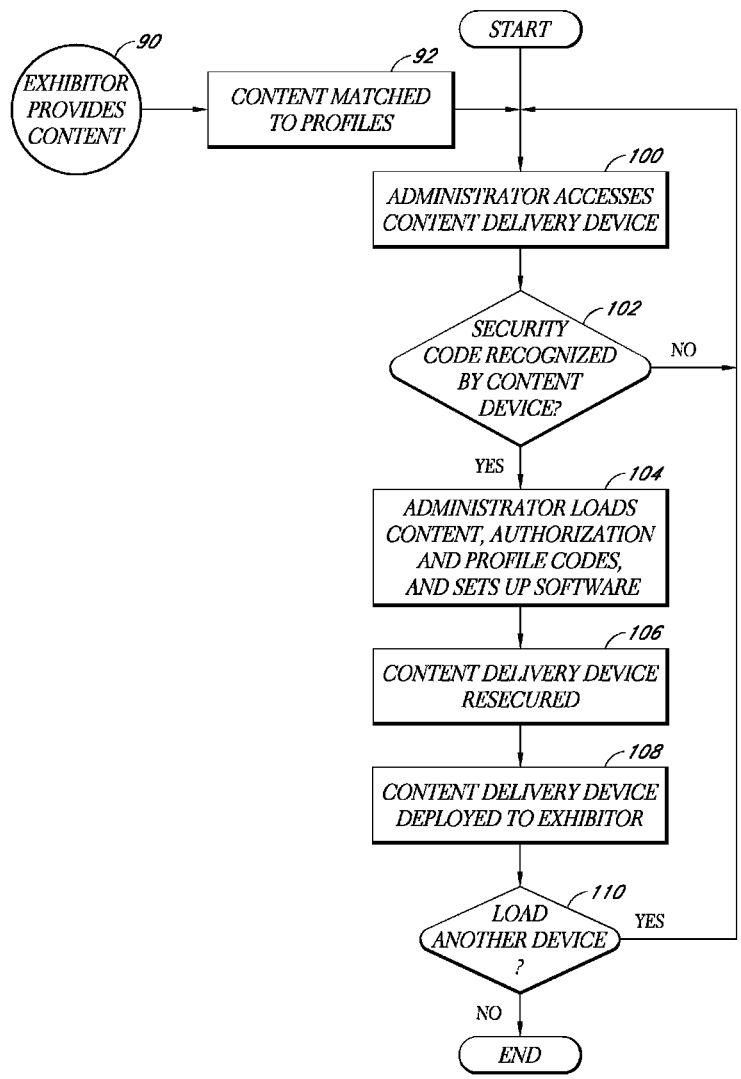
FIG. 3 is a flow chart depicting programming a secured content delivery device according to one embodiment.

With reference next to FIG. 3, a flow chart is provided of one embodiment for setting up such a content delivery device 50. More specifically, FIG. 3 shows an embodiment of a routine in which an administrative system sets up customized electronic content for a vendor's content delivery device 50 so that it is customized for the vendor's particular needs and product information.

In the illustrated embodiment, the administrator preferably defines which profiles will be available for customized content to be associated with specific profiles. The exhibitor thus provides electronic content 90, and indicates which of the content is intended to correspond 92 to the profiles defined by the administrator. For example, certain exhibitor files may be provided in the French language and are, of course, coded to correspond to a profile of an attendee having a French-speaking preference. However, a default content is in English, thus if a user has no profile or has an English-coded profile, the user will receive the electronic content in the English language.

Upon the start of setting up the exhibitor's content delivery device, the administrator first accesses 100 the computing portion 52 within the content device 50. Preferably, this involves electronically connecting with the processor. Preferably, a security code must be successfully entered by the administrator in order to gain access to make any changes to the content and profile codes defined on the content device. In one example, a code, such as a hexadecimally encrypted authorization code, is stored on the content delivery device, and the administrator must interact with a security software routine to match that code in order to gain access to the device. Any of several available electronic security routines and measures may be employed.

Once the security measures are satisfied 102, access is granted. Preferably, the memory portion 52 of the device has already been cleaned so as, for example, to remove content from a previous use of the device. But if not, the memory portion 52 is cleaned before any content is loaded. The administrator then loads 104 the content provided by the exhibitor along with the chosen profile codes as necessary. Further, the administrator will clarify which of the loaded content corresponds to which of the profile codes. Yet further, the administrator may add or update software routines for content delivery to a portable memory device as necessary.

Once such setup has been completed, the content delivery device 50 is resecured 106. Such resecuring of the device preferably entails, for example, electronic securement through providing a coded access requirement. In a preferred embodiment, simply electronically disconnecting the content delivery device from the administrator computer resets the device so that it again can only be accessed through satisfying the security measures.

In other embodiments, securement of the content delivery device 50 also involves physical securement. For example, electronic access to the hardware within the box may only be allowed through a locked door or window in the housing. Upon completion of programming of the device, the administrator may physically lock the window with a lock and key so as to provide both physical and electronic securement of the content delivery device. Other methods and apparatus for physical securement may include structures, such as a holographic sticker, which will indicate when a device has been tampered with.

Once set up has been completed and the box has been resecured, the content delivery device 50 is issued 108 to the exhibitor to be maintained at the exhibitor's booth. The administrator may then choose to set up another content delivery device for the same or another exhibitor or may shut down the setup routine.

As just discussed, administrator-controlled set up of content delivery devices enables close control by the administrator of the content uploaded by such devices to a user's portable memory device. Preferably, the administrator uses a uniform criteria to control such content. Such control may involve tightly controlling the size of the electronic files to be uploaded as well as inspecting and controlling the electronic content to root out nefarious and inappropriate content so as to maintain the dignity of the trade show. The administrator may also inspect the exhibitor's proposed content to ensure that it appropriately matches the chosen profiles. Further, in some embodiments the devices may be programmed to operate only during specified trade show hours, as a method of preventing hacking. Employing both physical and electronic security helps to ensure such administrator control of content and operation is perpetuated and an exhibitor does not or cannot hack into the content delivery device in order to defeat the administrator's controls and proliferate unregulated content.

In one embodiment, and with reference again to FIG. 1, the administrator can access the content delivery device computer, interact with the security device, and then have access to make changes to the computer software and content files through the input interface 62, which is dedicated for such access. In some embodiments the connectors 64 of the input interface 62 are physically different from and spaced apart from the delivery interface 60 through which content from the content device is delivered to a portable memory device 40. Additionally, preferably the delivery interface 60 is configured to be inoperable for any use other than operating a data delivery routine as discussed herein.

It is to be understood that, in additional embodiments, additional or different security controls may be employed. For example, the content delivery device hardware may include provisions to detect whether the physical barrier, such as the locking window, has been defeated, thus providing access to the electronics within the device. Upon detecting defeat of the physical security barriers, the software is prompted to become inoperable, and the content delivery device must be reformatted or otherwise unlocked by the administrator. Thus, the content delivery device cannot be hacked, and the exhibitor will have to approach the administrator in order to get the content delivery device working again, at which point the administrator will be able to ensure that physical and electronic barriers are maintained in order to maintain security.

Figure 4:
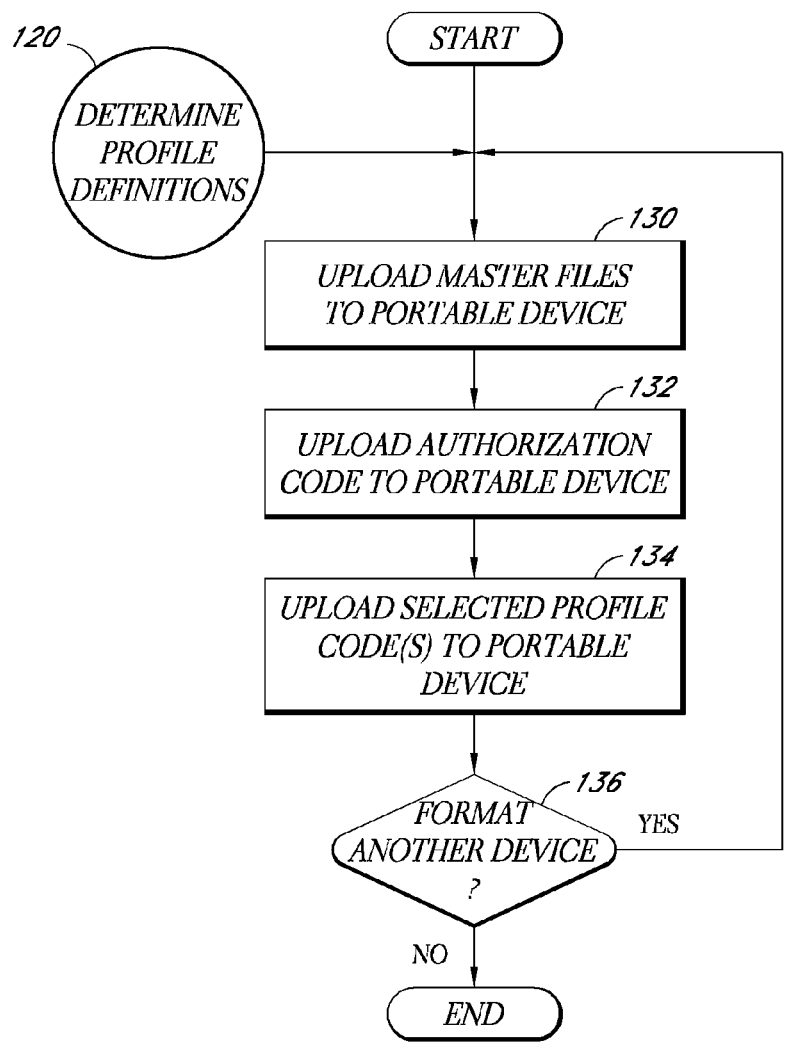
FIG. 4 is a flow chart depicting initializing a portable memory device according to one embodiment.

According to one embodiment, the portable electronic memory device is provided by the trade show administrator, and is formatted by the administrator before being given to the user at the trade show. With reference next to FIG. 4, a flow chart is provided showing an example routine for how an administrator might setup a portable device for a user to use in a trade show according to one embodiment. As shown, upon start of the routine for initializing the portable memory device, and before initializing any such portable devices, the administrator will determine 120 eligible profile definitions. For example, although profile preferences can be as varied and detailed as desired, they can also be fairly simple. For example, in one embodiment, the profile preferences are limited to language. In one such embodiment, the only profiles, or preferences available are an English preference or a Spanish preference. In other embodiments, several different languages may be available, but the profiles are limited only to language preference. In still further embodiments, the administrator may recognize a desire to provide relatively detailed profile preferences such as, for example, language preference, technology competence level, job description or category, desire for detail, and the like.

In one embodiment, a registrant may select his or her desired profile(s) while registering for the trade show. Thus, in response to the profile(s) chosen, the administrator may set up a portable memory device customized for each preregistered attendee. Alternatively, the administrator may set up a certain number of portable devices for each of the approved profiles, and upon arrival at the trade show, the attendee will be issued a portable device that has been preconfigured with a profile that best matches her profile preferences. Preferably, portable devices that have been preconfigured according to a profile, such as a particular language, are labeled accordingly.

With continued reference to FIG. 4, in one embodiment prior to or in addition to uploading any specific profile codes to the portable device, the administrator may wish to upload master information 130 about the trade show. For example, a list of vendors/exhibitors, a map showing the vendors' booth locations, and in some embodiments brief descriptive information and/or advertisements from all or selected vendors may be preloaded on every portable memory device. Whether or not such master information is pre-installed, a software package and/or file folder structure preferably is installed 132 which will include the authorization code that must be read and identified by a content delivery device before the delivery device will upload any information to the portable device. One or more selected profile codes preferably will also be uploaded 134 to the portable device, and setup of the device can thus be complete.

Preferably, the file/folder structure and placement of the authorization and profile codes is configured to complement the routines programmed into the content delivery devices so that the content devices know where on the portable devices to find the codes and where to save uploaded files. In some embodiments, after setup, the device will be labeled such as with a sticker, text, or color in order to visually indicate which profile(s) is tied to that particular portable device. According to the routine, preferably the administrator will have the opportunity to format 136 another portable memory device, and if not the routine will end. In other embodiments, the administrator may contract with a third party, such as a manufacturer or supplier, to format portable memory devices for the trade show.

In embodiments as just discussed, the portable device is supplied by the administrator to the user. In another embodiment, the user's own portable device can be set up with an authorization code and profile code as desired in order to interact successfully with the content delivery devices. For example, the user may bring their own iPod® to the trade show as their portable memory device. In one embodiment, the user during trade show registration may connect her iPod® to the administrative computer system, which will upload the authorization and profile code selected by the user. Such upload preferably will include a file/folder structure and software routine, if desired, to make it simple for the content delivery device to find and read the authorization and profile codes. In still other embodiments, the administrator computer system will include instructions to the content delivery device as to where upon the user's portable device to upload electronic content. For example, interacting with the administrator's system may result in creation of a file or folder specifically for holding information from the trade show. Preferably, such file(s) is created upon set up, but in other embodiments one or more files or folders can be created by the content delivery device during interface.

Initializing of the user's own portable device can be done in many ways, not just at registration for a trade show. For example, certain handheld computers such as a Blackberry® PDA, can be remotely initialized such as through an online registration, if desired. Still further, standalone kiosks may be provided at the trade show to enable trade show attendees to initialize and set up their own portable memory devices. Preferably, upon registration for the trade show, the attendee is issued an access code that will enable them to initialize their own personal portable memory device(s) online or at a kiosk or the like so as to interact with the administrator's content delivery devices. In further embodiments, a kiosk can dispense additional portable memory devices if, for example, an attendee has filled his first device.

In embodiments discussed herein, attendees have obtained product information by interacting with content delivery devices dedicated to particular products and, preferably, located at a vendor's booth. In another embodiment, one or more kiosks function as content delivery devices for several, or even all, of the vendors at the event. By interacting with an interface such as a touch screen, the attendee can choose particular vendors and particular products, and upload such chosen content to his portable memory device without necessitating a physical visit to the particular vendor's booth.

Figure 5:
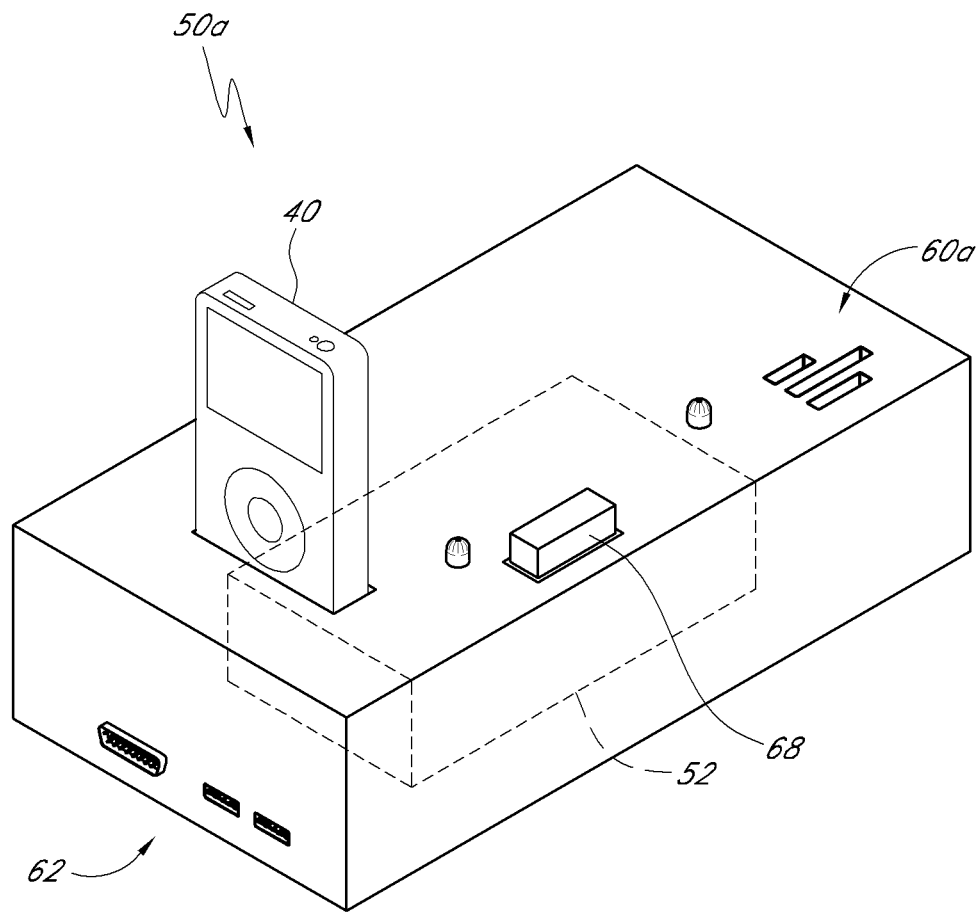
FIG. 5 illustrates another embodiment of a content delivery device.

In the embodiment illustrated in FIG. 1, the content delivery device 50 has four USB-type ports 60, each of which electronically communicates with the computing portion 52 of the device. It is to be understood that, in other embodiments, there may be various different ways of electronically interfacing between the content delivery device and the users' portable memory storage device. This is especially true in embodiments in which the delivery devices are capable of interfacing with several different types of devices. With reference next to FIG. 5, another embodiment of a content delivery device 50a is presented in which a plurality of different types of ports 60a are provided. As shown, a USB port is provided, as well as multiple slots for accommodating various types of memory-cards.

With continued reference to FIG. 5, an adapter 61, such as an adapter for an iPod® or similar device, is also provided for interaction between a content delivery device 50 and a portable device 40. Further, the illustrated content device includes an actuator 68 which, in a preferred embodiment, actuates a wireless or Bluetooth type of interface so that upon depressing the actuator 68 and holding the portable device near the content delivery device 50a, the devices will interface and content will be uploaded to the user's portable device 40. In another embodiment, there is no need to depress the actuator, as a wireless connection will be initiated whenever a portable device is close enough to the content device, and data upload will proceed when approved by the portable device user.

It is to be understood that although only a few different ports 60a are shown in the embodiment illustrated in FIG. 5, any current and future method and apparatus for electronic interaction between two devices can be used for the content delivery device 50a to interact with and upload selected electronic content to a user's authorized portable memory device 40.

Also, as discussed above and with reference next to FIG. 6, the administrative computing system 200 may access the content delivery device 50. In the illustrated embodiment, the administrator computer is electronically linked to the content delivery device 50 through a physical medium such as a cable 202. In a preferred embodiment, the cable 202 connection is only in place for electronic communication (such as data transfer) with the administrator computer 202, and the content delivery device 50 is disconnected from any other computing device for normal operation.

Figure 6:
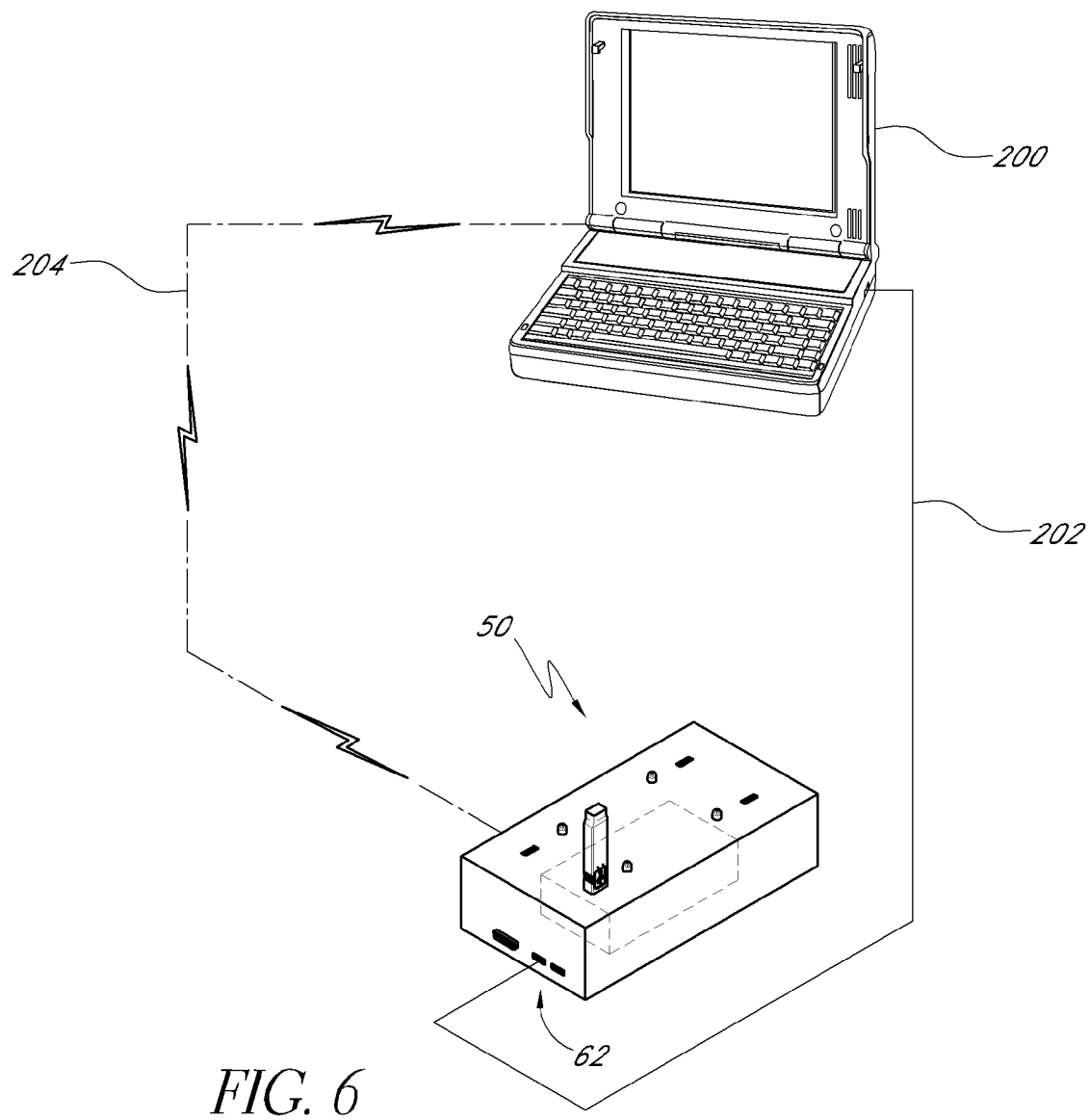
FIG. 6 schematically illustrates an arrangement for programming a secured content delivery device according to one embodiment.

FIG. 6 also shows an alternative embodiment in which a wireless connection 204 can be established between the administrative computer 200 and the content delivery device 50 instead of a cable 202 connection. Preferably, the wireless connection 204 is a secured connection so that only the administrative computer 200 can gain access to the computer portion 52 of the content delivery device 50.

Figure 7:
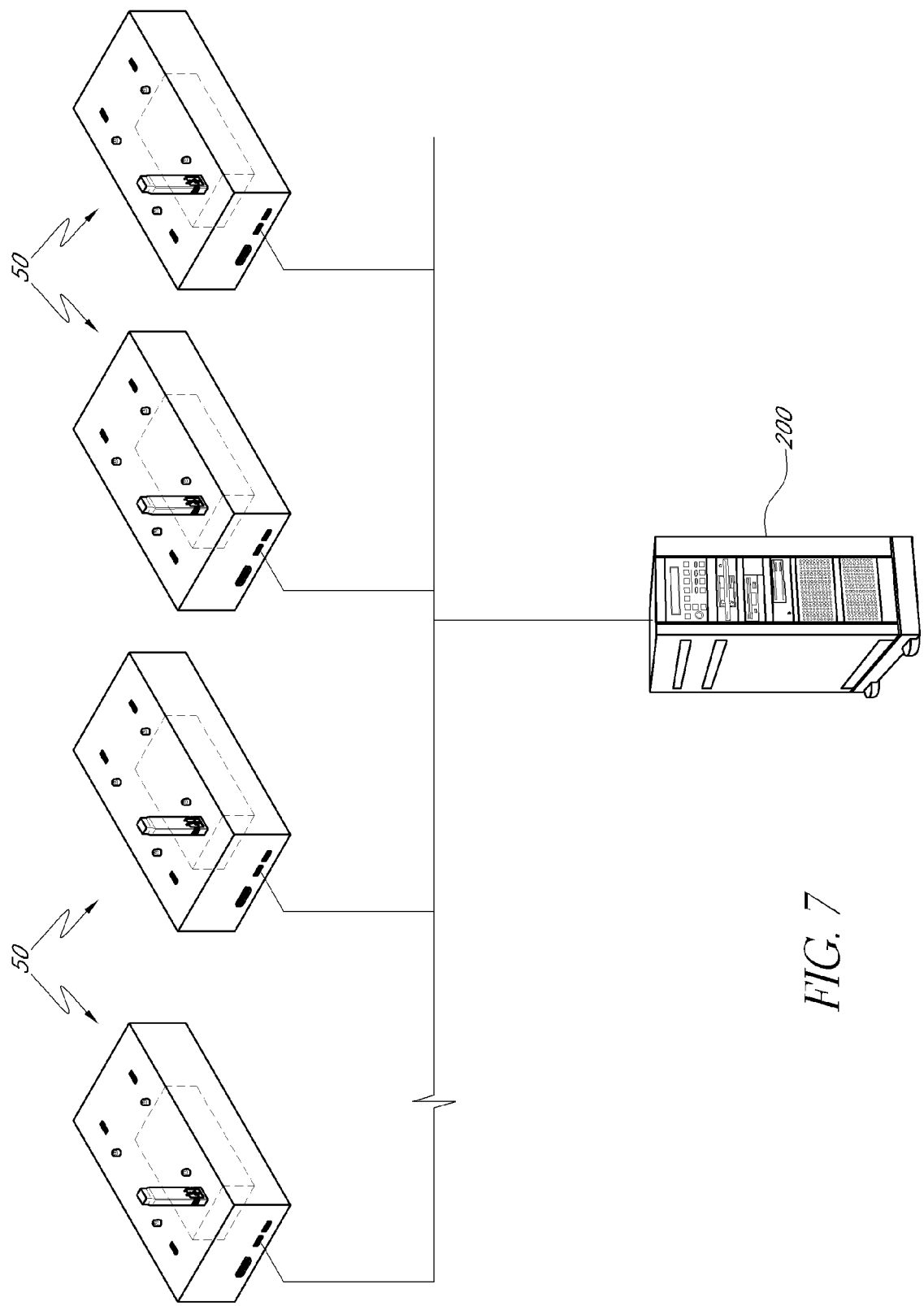
FIG. 7 is a schematic representation of another embodiment of a system and method that incorporates a network server.

In the embodiments discussed above, each content delivery device 50 is a standalone device that operates on its own, and has electronic content stored therewithin for eventual delivery to authorized portable devices 40. With reference to FIG. 7, another embodiment is illustrated in which an administrative computer system 200 such as a server controls several content delivery devices 50. In such embodiments, the server may download specific exhibitor information to corresponding ones of the content delivery devices. For example, each content delivery device 50 preferably has its own identification (such as a MAC address), and the server 200 will download only the correct information for the exhibitor corresponding to that MAC address. In this embodiment, the electronic content is stored on the content delivery device and delivered therefrom to the user's portable device.

In another embodiment, the electronic content is stored at the server 20, yet upon an interface between the user's portable memory device 40 and a selected one of content delivery devices 50, the server delivers the appropriate content to the portable device by way of the content delivery device. In such an embodiment, the electronic computing ability of the content delivery device is not necessarily the same as in the standalone embodiments discussed above, and in fact the content delivery device may have limited, if any, memory capability.

Embodiments disclosed herein provide secure control by an administrator of content to be selectively uploaded to a user's portable memory storage device and potential customization of such content delivery to match the user's preselected preferences. Such principles can be employed in trade shows, professional gatherings, education and other settings. In one embodiment, portable memory devices having certain preferences are preinitialized (such as by a manufacturer, to match a master device) and gathered, for example, in bins at the registration site of a trade show or conference. When a registrant registers and indicates a preference for, for example, content delivery in a first language, the administrator issues the registrant a portable memory device from the bin that has been preinitialized with a preference or profile code corresponding to that particular language and, preferably, which has been correspondingly labeled. In other embodiments, profile preferences may be more complex, and portable memory storage devices may be initialized with profile codes at the time the registrant checks in to the trade show or conference. In still other embodiments, registrants may initialize their devices for the authorization and profile codes online or at kiosks or other computer desks provided by the trade show administrator.

In the embodiments disclosed herein, the authorization codes and profile codes have been disclosed as being different codes. It is to be understood that in other embodiments a single code can function as both an authorization code and a profile code.

In a preferred embodiment, an administrative body provides an online environment that exhibitors can use to manage the content they plan to distribute at an upcoming event such as a trade show or other exhibition. In one such embodiment, once an exhibitor has initially registered for an upcoming exhibition, the administrator provides a secure login through which the exhibitor or the exhibitor's representative can access the administrator's computer system and manage the exhibitor's content. For example, an exhibitor may access the administrator's website, log in to the administrator's computer system, and navigate to the particular event for which the exhibitor wishes to manage content.

Figure 8:
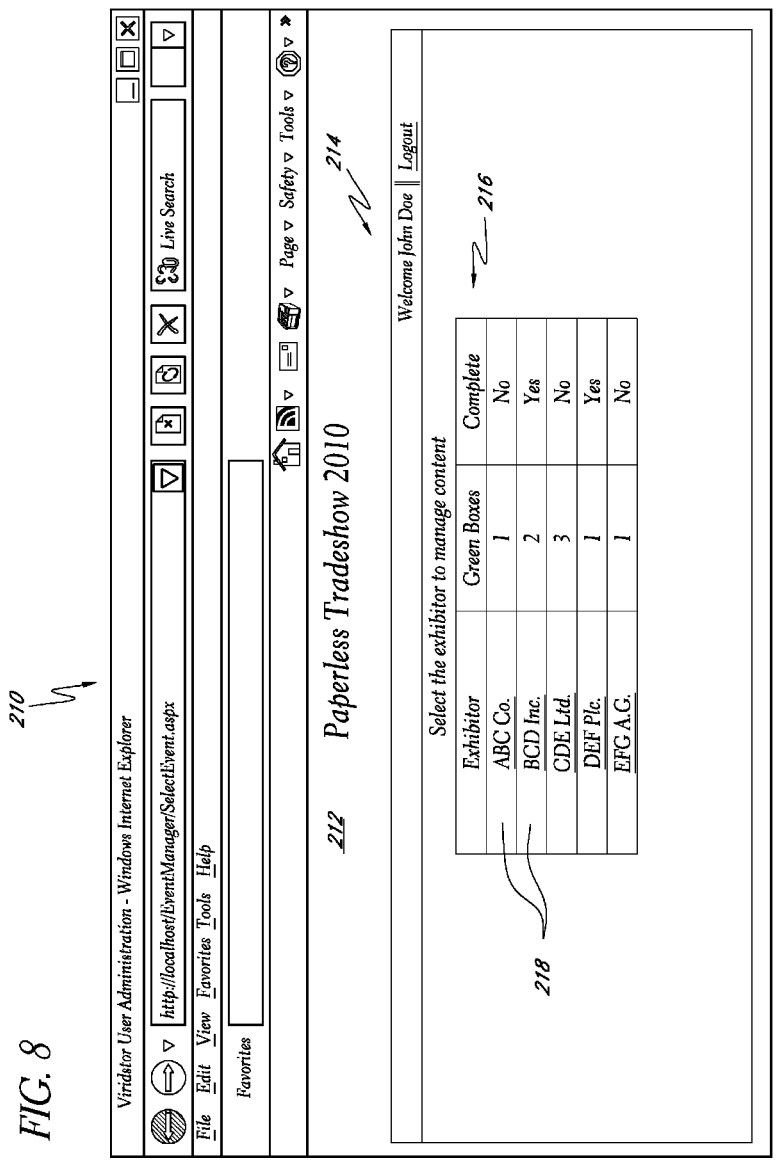
FIG. 8 shows a screen shot from an exhibitor computer while accessing an administrator system to manage content to be delivered at a future event.

With next reference to FIG. 8, an example screen shot is shown depicting a computer screen of an exhibitor/user who has logged in and navigated to the "Paperless Trade Show 2010" event page of the administrator computer system. As shown, the web page 210 includes a heading 212 indicating the particular event, a login status and information portion 214, and a status table 216 depicting the status of content preparation for a list of exhibitors. The illustrated embodiment relates to an example in which an exhibitor has engaged a third party public relations professional to help them prepare for the event. The status table 216 lists all of the exhibitors that this particular public relations professional is representing. The table 216 further displays the current status of the each listed exhibitor's content registration for the event, including whether content upload is complete and how many content delivery devices (labeled "green boxes" in the figure) have been requested for the particular exhibitor.

Figure 9:
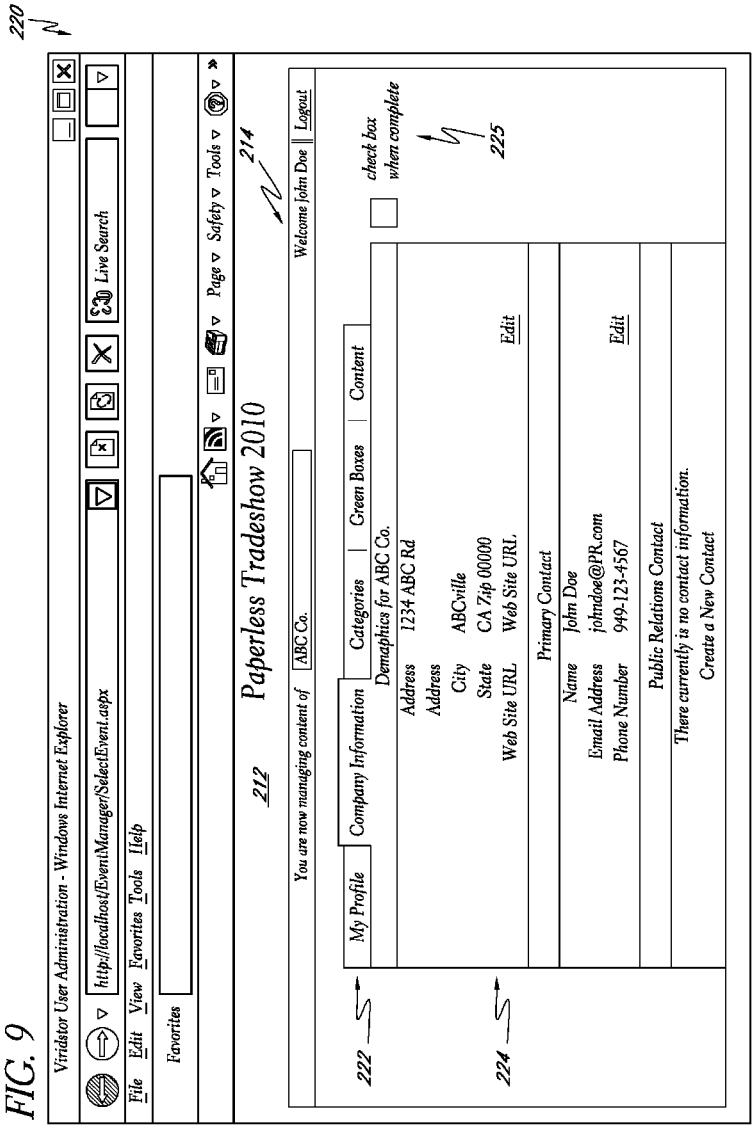
FIG. 9 shows a screen shot from an exhibitor computer while accessing an administrator system verifying or updating certain exhibitor information.

By clicking on the link to a particular exhibitor, the representative has access to the particular exhibitor's information. Specifically, and as shown in FIG. 9, the exhibitor representative is directed to a web page 220 having several tabs 222 corresponding to aspects of managing the exhibitor's content. For example, the web page 220 depicted in FIG. 9 illustrates demographic and contact information 224 about the exhibitor, which information the exhibitor can update as appropriate. Preferably an action box 225 enables an exhibitor to indicate when this section is complete. As such, the administrator and/or the exhibitor or exhibitor's representative can monitor the status of various registrant's content management. And in some embodiments a similar action box is provided to indicate when each tabbed section has been completed.

Figure 10:
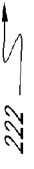
FIG. 10 shows a screen shot from an exhibitor computer while accessing an administrator system to categorize exhibitor content

With reference next to FIG. 10, another of the tabs 222 links to a web page 226 at which the exhibitor is given the opportunity to categorize the products and/or materials that will be exhibited at the upcoming event. Preferably the selected categories 228 will be associated with the exhibitor's content delivered to the attendees' portable memory devices, and preferably such attendees will be able to sort uploaded content by category, as will be discussed in more detail below.

Figure 11:
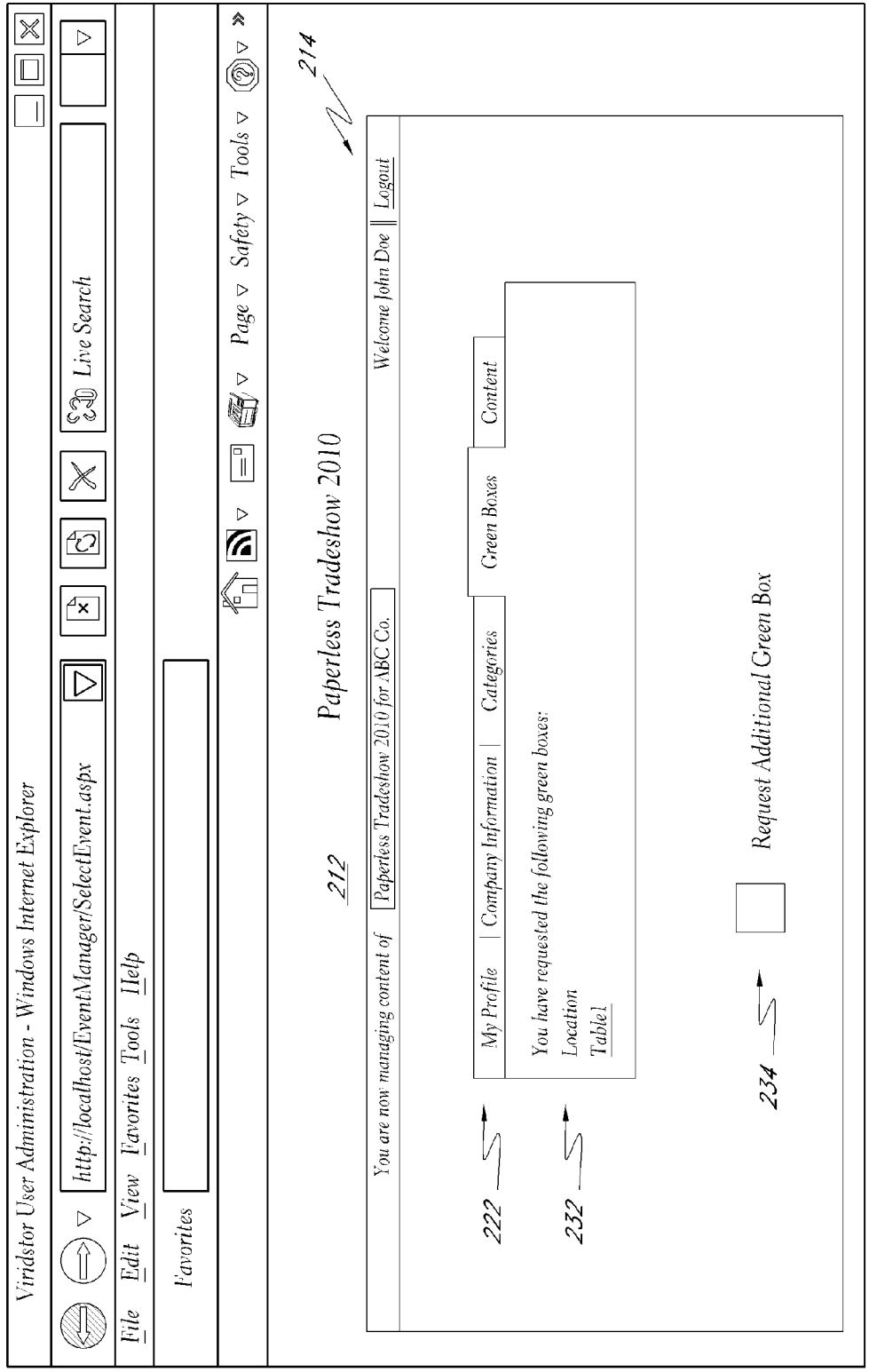
FIG. 11 shows a screen shot from an exhibitor computer while accessing an administrator system to manage requests for equipment to be used at a future event.

With reference next to FIG. 11, another of the tabs 222 links to a web page 230 which includes a listing 232 of the content delivery devices (a.k.a. "green boxes") that were requested by the exhibitor when initially registering for the event. Preferably, such content delivery devices are identified by the location within the exhibitor's booth for which the device will be placed. In other embodiments, the devices can be identified by associated products, a system of successive numbering, or the like. Preferably, an action button 234 enables the exhibitor to contact the administrator to request an additional content delivery device.

Figure 12:
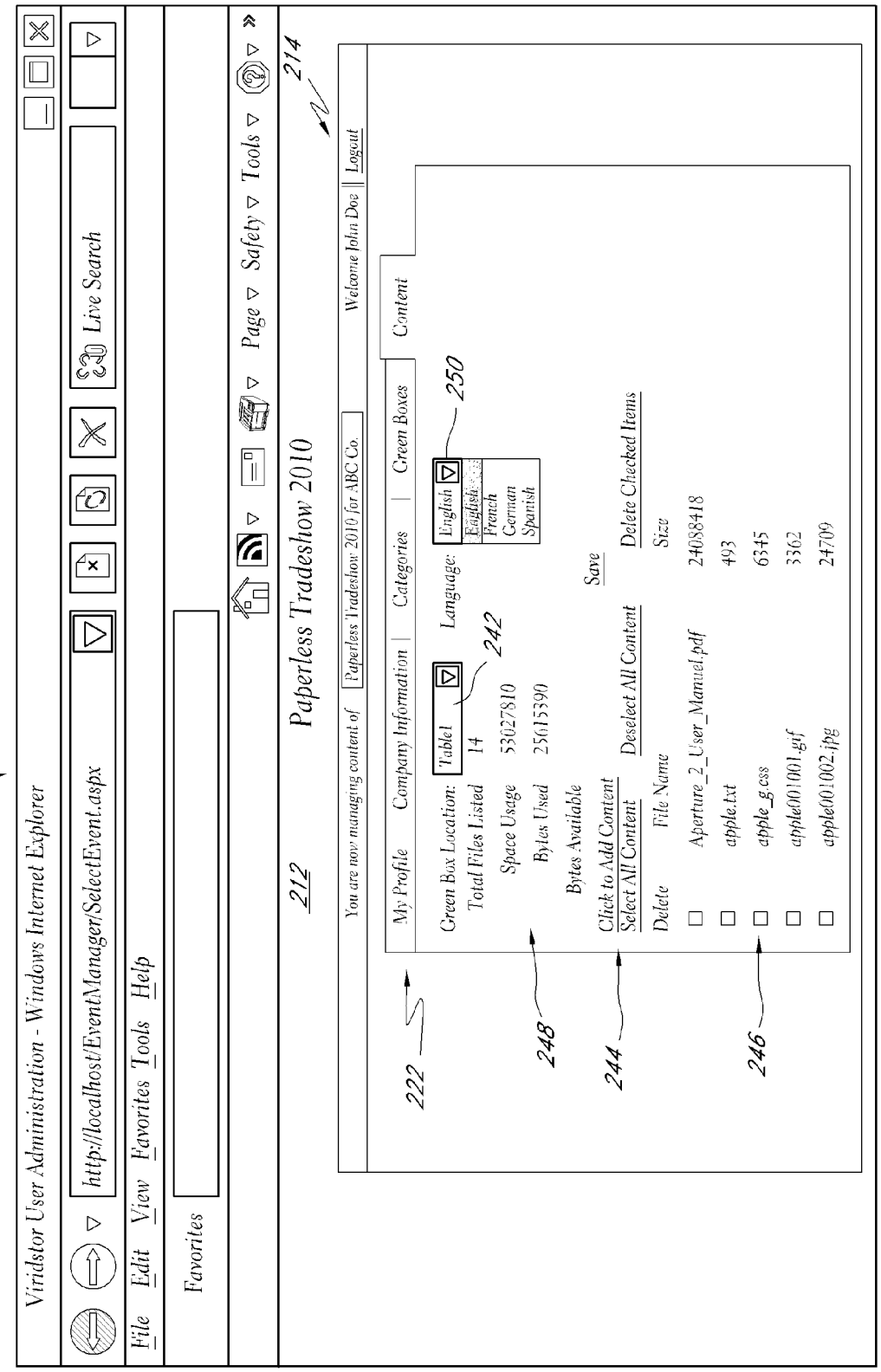
FIG. 12 shows a screen shot from an exhibitor computer while accessing an administrator system to upload and otherwise manage digital content to be used at a future event.

With reference next to FIG. 12, another of the tabs 222 links to a web page 240 at which an exhibitor can upload electronic content to the administrator's server. A device indicator box 242 displays to which of the content delivery devices the particular content is intended to be downloaded. Action buttons 244 enable a user to add, select, delete and otherwise manage content uploading. A file listing 246 displays the content that has already been loaded, and a space tracker 248 tracks how much memory space has been taken so far. A language indicator box 250 links particular files with a particular language. In the illustrated embodiment, language is the only attendee profile preference accommodated at this particular event. In other embodiments, further such indicator boxes can be provided to link particular files with further profile preferences as the administrator sees fit.

As discussed above, preferably the administrator imposes a volume limit to the content that each exhibitor is allowed to upload to an attendee's portable device. The content management web page 240 monitors the volume of content associated with each language or other profile for each content delivery device. In one embodiment, if an exhibitor attempts to upload too much content, an error notice will be generated and the exhibitor will be given an opportunity to delete some of the content.

In one embodiment, once the exhibitor has uploaded all anticipated content, the exhibitor is given an opportunity to test such content such as by uploading it to a portable device such as a thumb drive. The exhibitor can then test the thumb drive to ensure that the content behaves in a manner as desired. As such, technical considerations concerning the exhibitor's content can be addressed and resolved well before the actual event.

Since the content of many exhibitors will be uploaded on the administrators' servers, the administrator has an opportunity to run virus-checking programs and the like to thoroughly review the content and remove risks that may be detected.

In an event such as a trade show, every exhibitor will have at least one content delivery device, and each content delivery device must be custom-loaded with electronic content specific to that device. As such, there are substantial logistical challenges in distributing loaded devices at the beginning of the event in a timely manner. In one embodiment, the administrator prepares all of the content delivery devices with customized content for each exhibitor before the trade show begins. Thus, when each exhibitor checks in, administrator staff locates the appropriate pre-loaded delivery device and gives it to the exhibitor.

In another embodiment, content delivery devices are delivered to the trade show in a neutral configuration. A neutral device has no exhibitor content saved thereon but includes certain subject matter such as a device identification number and operational and security software.

Figure 13:
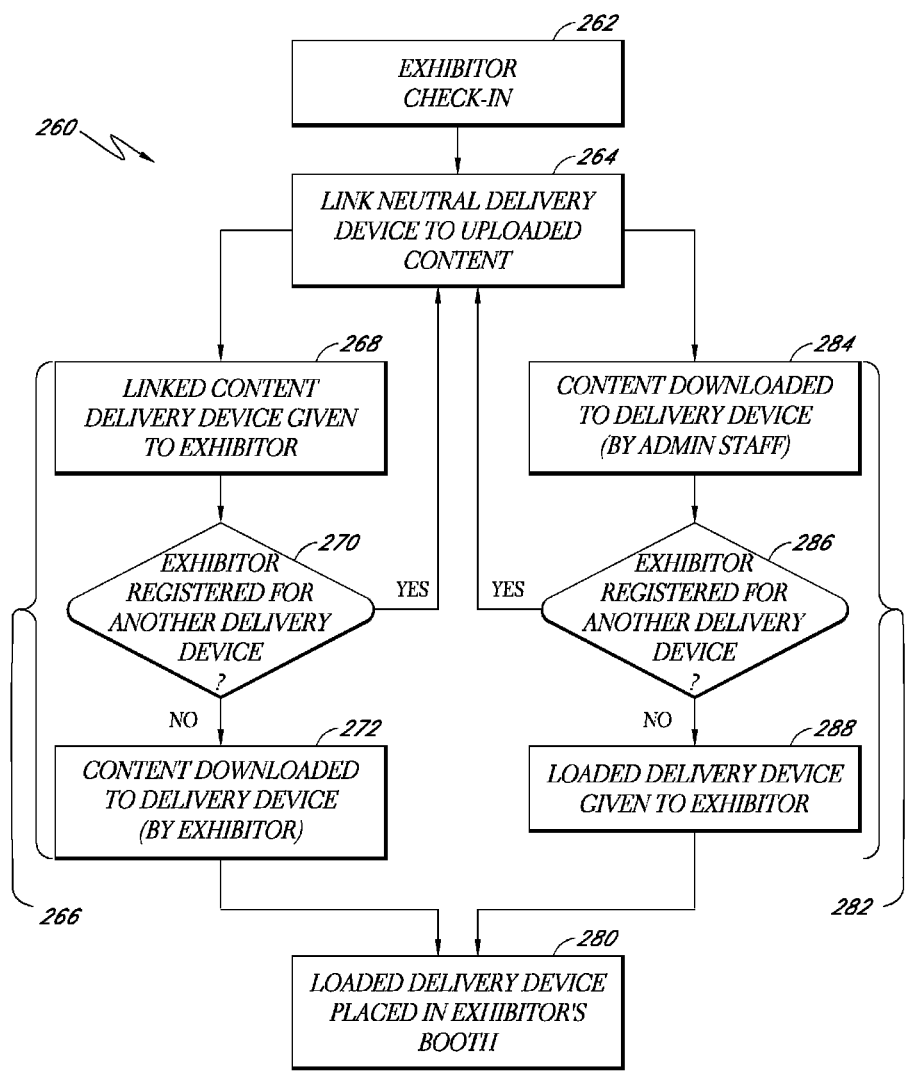
FIG. 13 is a flow chart depicting checking in an exhibitor at an event and loading a content delivery device.

With reference next to FIG. 13, one embodiment of a method 260 is presented for loading and distributing content delivery devices. In the illustrated embodiment, when an exhibitor or an exhibitor representative initially checks in 262, administrator staff accesses the administrator computer to initiate the check-in process. In some embodiments the administrator computer system is accessed online; in other embodiments the administrator may transport server(s) to the event so that computing is performed onsite. The administrator staff reviews the exhibitor's registration and identifies content associated with requested delivery devices. As indicated in step 264, the administrator then links particular exhibitor content previously uploaded to the server with a neutral delivery device.

Each neutral box preferably includes a scannable identification code such as a UPC code. In one embodiment, the administrator generates a label corresponding to the particular content, preferably including the location or name associated with the content. The label preferably also has a scannable code. The label is affixed to the delivery device. The administrator staff then preferably scans both the device's identification code and the label code. This action establishes a link in the administrator computer between the uploaded content and the particular delivery device. In another embodiment, the administrator staff highlights the content, or device location, as displayed on her computer screen, and then scans the device identification code. Either approach has the effect of establishing a link in the administrator computer between the uploaded content and the particular delivery device, and Applicant anticipates that other methods can be employed to link neutral delivery devices with uploaded content on the administrator computer system. Notably, at this point in the process, the content has not been downloaded to the delivery device.

With continued reference to FIG. 13, in one embodiment associated with step group 266, once a content delivery device is linked to particular uploaded content, the linked, neutral delivery device is given 268 to the exhibitor. The administrator staff checks 270 to see whether the exhibitor has registered for another delivery device and, if so, links the additional content to an additional neutral delivery device, and again gives the linked device to the exhibitor. Once all the exhibitor's uploaded content and requested devices have been appropriately linked, the exhibitor is directed to a downloading station having one or more cables electronically connected to the administrative server.

To download content to the delivery devices in accordance with step 272, the exhibitor plugs a cable into an appropriate connector (such as an Ethernet, LAN, firewire, USB or other data transfer port) in the connector section 62 of the delivery device, and download of the appropriate content proceeds automatically. More specifically, the administrator server preferably is monitoring access points such as the station cables, and when a delivery device is detected, a software routine is initiated in which the administrator computer first satisfies the security routine to gain access to the computer portion 52 of the delivery device 50, reads the device identification code, and notes the link to uploaded content. The administrative server then downloads the linked content to the device.

Once the linked content has been downloaded, the content delivery device 50 is ready for full operation without any further electronic communication with the administrative server. The exhibitor thus removes the cable, and deploys 280 the loaded delivery device to its correct position in the exhibitor's booth. Preferably, the label affixed to the delivery device helps the exhibitor determine which device goes to which location in the booth.

With continued reference to FIG. 13, in another embodiment associated with step group 282, once the content delivery device 50 is linked to particular content, the administrator staff proceeds to plug the content delivery device into the administrator server and, in a manner as discussed above, the linked content is automatically downloaded 284 to the device. The process is repeated for as many devices as the exhibitor has requested 286, and the loaded delivery devices are given 288 to the exhibitor who, as discussed above, deploys 280 them as appropriate in the exhibitor booth.

As noted above, in preferred embodiments, once the neutral content delivery device has been linked to particular uploaded content, the process of downloading such content through the neutral box is performed automatically upon connecting the device to the administrative server. Thus, the downloading operation can be performed by administrator staff, or by the exhibitors themselves, thus freeing up staff to process further exhibitors, and speeding up the customization and distribution of content delivery devices. Additionally, since the software preferably is substantially self-executing, very little specialized training is necessary for the administrative staff to perform their roles in the process. In fact, in still further embodiments, the process may be completely self-service in that an exhibitor may obtain a neutral box at a kiosk, link the box to the uploaded content, and then connect the box to the administrative server, prompting automatic download of the linked content, all without requiring administrative staff assistance.

Figure 14:
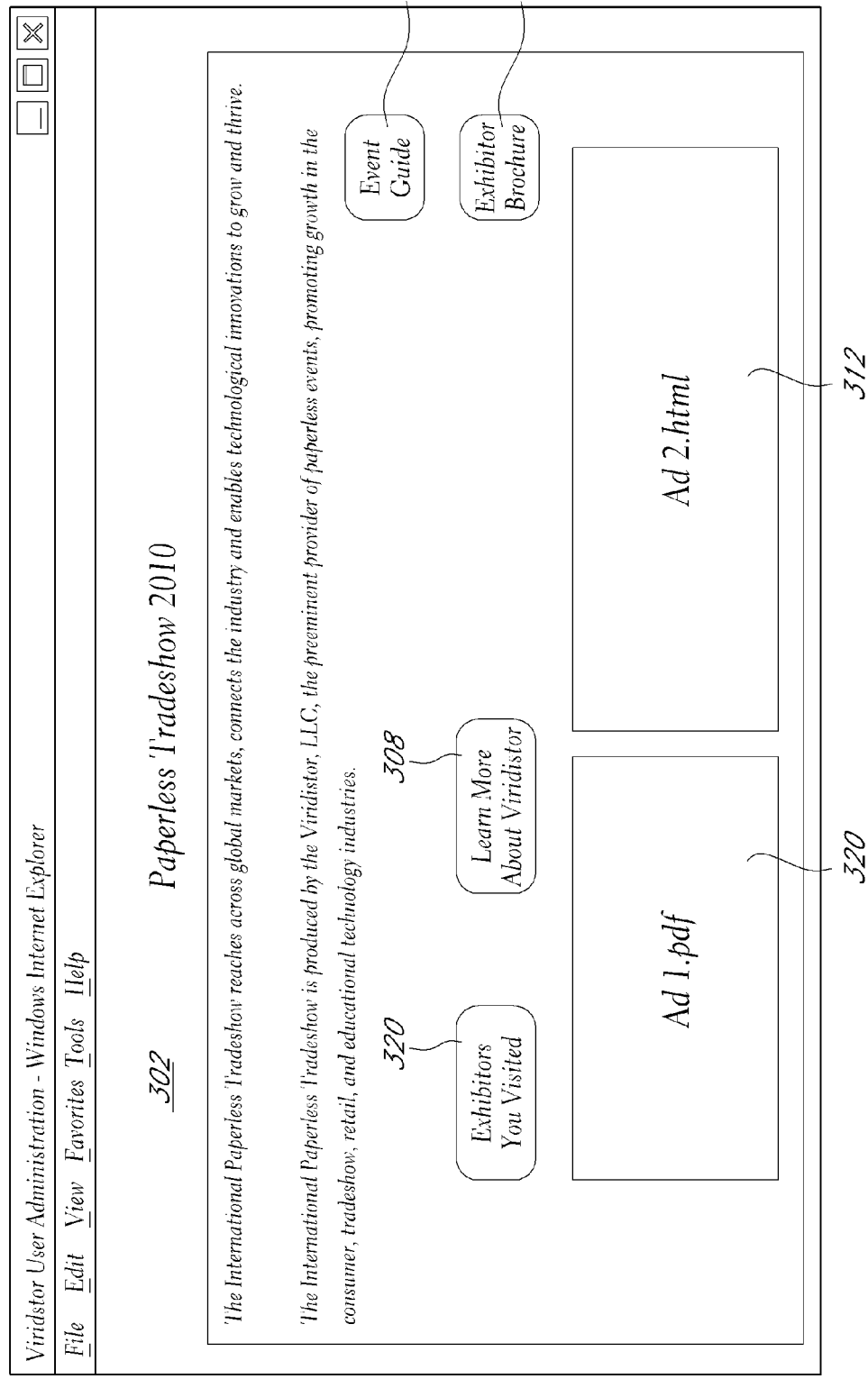
FIG. 14 shows a screen shot from an attendee computer showing a menu preloaded onto a portable electronic memory storage device in accordance with one embodiment.
Figure 16:
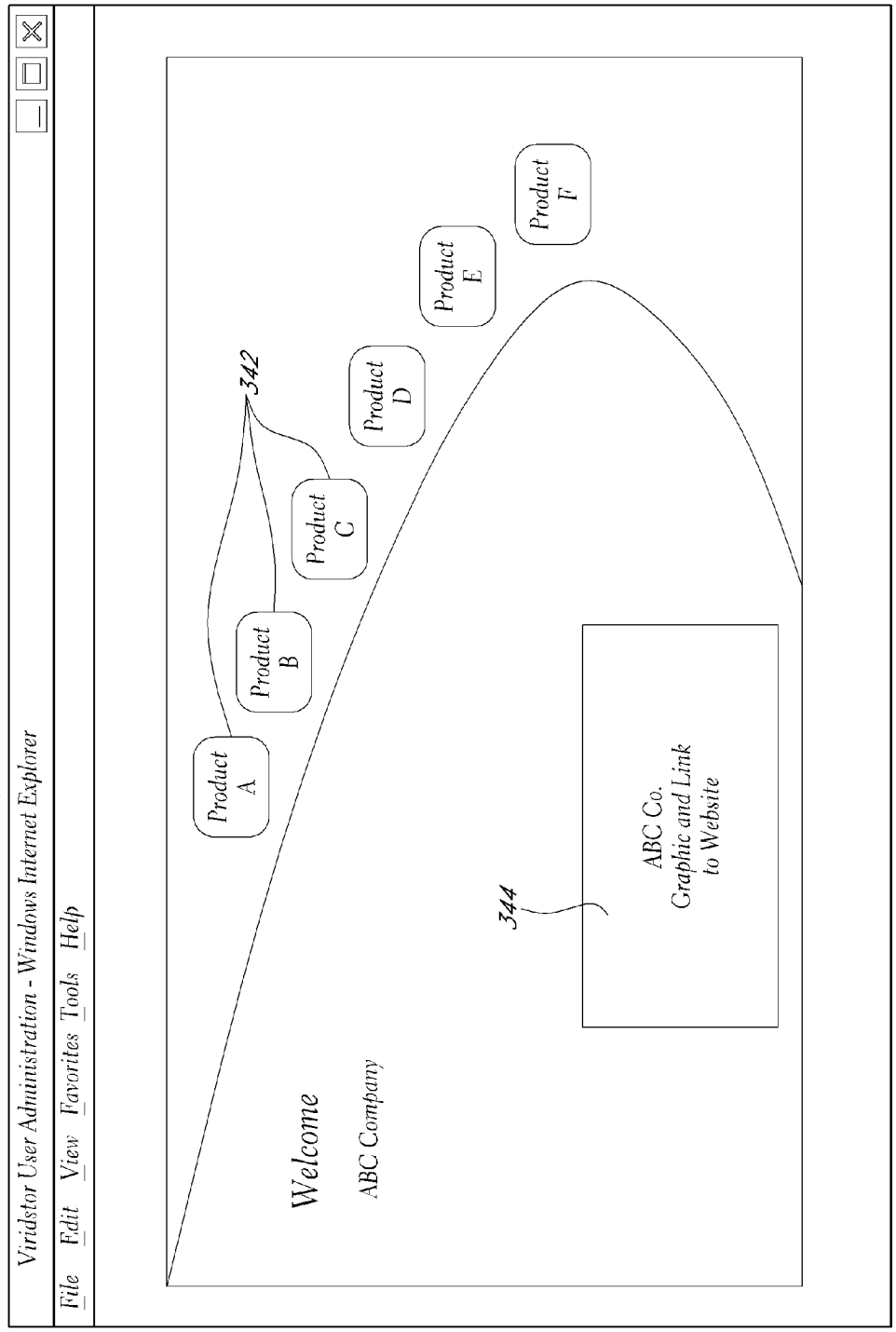
FIG. 16 shows a screen shot from an attendee computer showing an example menu presenting electronic content provided by an exhibitor.

With reference next to FIGS. 14-16, preferably the portable memory devices 40 distributed to attendees are initialized with operating software, security features, and, preferably, other basic information before being distributed to attendees.

With reference next to FIG. 14, in one embodiment each portable memory device is preloaded with organizational files and a menu-driven system which, in some embodiments, may be self executing upon connection of the device to a computer or the like. Also, in some embodiments, the files and system are configured to be loadable onto other computer-type devices, such as a smartphone or e-book reader such as the Kindle®. In the illustrated embodiment, a main menu page is configured specific to the particular event. The illustrated main menu page has features to assist the attendee. For example, a button opens an event guide, which preferably is a file such as a pdf file pre-loaded on the portable memory device. Buttons may also lead to exhibitor lists or information about, for example, the administrator.

In some embodiments, advertisements may be included in the main menu. The advertisements may lead to files that are saved on the portable memory device or links to, for example, the advertiser's website.

With continued reference to FIG. 14, preferably a button is provided wherein the attendee can access a list of the exhibitors from which the attendee uploaded information at the event. Clicking on the button leads to the screen shot of FIG. 15, which presents one embodiment of such a listing. As shown, a list of several exhibitors is presented, with each exhibitor name having a link to that particular exhibitor's content. Also, preferably a category listing is provided, and the attendee can sort the content and exhibitor list by category. Preferably the categories are the same categories that were identified by the exhibitors above in connection with FIG. 10.

As the exhibitors preferably control their content, in some embodiments exhibitors will organize their content with a menu-driven approach. For example, clicking on the link to "ABC Co." in FIG. 15 leads to the screen depicted in FIG. 16. In this embodiment, the menu presents an attractive interface that leads to buttons to access particular products, as well as providing a link the exhibitor's website. Of course it is to be understood that other approaches may be employed in variations in format and features can be expected. Also, the complexity of the exhibitor's menu must be balanced against limits to the content volume they are allowed to upload.

The embodiments discussed above have been discussed in the context of a trade show with a trade show administrator, exhibitors, and trade show attendees. It is to be understood that the principles disclosed herein can be applied in other settings and applications as well, including events such as professional conferences and nonevents such as general sales organizations or informal and formal educational applications.

For example, in an educational environment, a teacher may have a content delivery device dedicated to his classroom. Preferably the teacher also has a login to an administrator's website (which, in some embodiments, can be a website or network address administered and owned by the school or school district), which login enables the teacher to access, upload, and customize data he wishes to be delivered to the students. Once the content has been organized and finalized by the teacher, the content delivery device associated with that particular teacher can be updated by connecting it to a network connection. Preferably, software within the content delivery device is configured to detect a network connection and seek out a specific, linked network location, which location contains the content controlled by the associated teacher. Content updates are then made automatically according to software routines. Once the content is updated, the content delivery device can be disconnected from the network connection and is again free to operate on its own.

In other embodiments, a content delivery device can be configured with software that will sense an internet connection and automatically log in to a linked web page to update and upload associated content.

In still other embodiments, content delivery devices may include, for example, wireless-enabled network connections that are configured to periodically access a particular web or server, and check to see whether there are any content updates. If updates are detected, the updates are loaded to the content delivery device. Thus, a content delivery device may be provided that is, essentially, self-updating.

In an example of an informal educational context employing features as discussed herein, such as a museum or art gallery, the museum may enable a visitor to initialize their own or a museum-provided portable memory device according to principles discussed in above embodiments. As such, scattered throughout the museum are content delivery devices generally corresponding to certain museum exhibits and/or attractions.

Attendees likely will find themselves more interested in some attractions than others, and for those attractions that they have particular interest they may interface with the corresponding content delivery device to obtain more detailed information than is possible to display at the museum. Nevertheless, such an attendee may pass on the opportunity to obtain more information about exhibits in which they are not particularly interested. Thus, after the museum visit is complete, the user will have additional information only about what most interests that particular user, and will not have to sort through additional information (such as a person would have to do while navigating the museum's website) in which they are not interested.

In a more formal educational setting, such as a classroom setting, a professor may have a dedicated content delivery device adjacent her office. The students may have their portable memory devices initialized with profile codes indicating, for example, the particular class that the student is a member of. The student can thus interact with the professor's content delivery device for specialized class content, information, grades, personalized comments or the like. As discussed above, because of security measures, such information will only be provided to authorized memory devices. In another embodiment a further level of security can be provided. For example, after the content delivery device has verified the authenticity of the memory device, and read the profile code identifying the student, the student is prompted to enter a password. In various embodiments, such password entry may be accomplished through an interface associated with the content delivery device or an interface associated with the portable memory device. Additionally, one or more content delivery devices can be associated with a kiosk, to which a student may connect by providing both a portable memory device and also a password. As such, in some embodiments, security requires not only a portable memory device, but also a password.

It is to be understood that an interaction between a memory device and a content delivery device can in some embodiments be accomplished remotely such as online, and using a student's home-based computer rather than or in addition to a portable memory device. Instead, a remote memory device such as the student's home or laptop computer may interact online with the professor's web page or school's web page to obtain only the information to which that student is entitled based upon the student authorization and profile codes and/or the information which that student would find relevant. Moreover, assignments can be specifically tailored to the student based upon the student's past performance, with a student being assigned more homework in areas in which the student has shown more need. Profile codes can be used to make such assignments, with the student's previous work qualifying him for a particular profile code.

In one preferred embodiment, despite the fact that a remote memory device such as a computer may be used to access a content delivery device—either online through the internet or through a local network, the user's portable memory device is still used to access the content delivery device. For example, once the user's laptop computer has engaged the content delivery device, for example through a network, the user will be prompted to engage his portable memory device with his laptop, and authorization approval is made via interaction between the content delivery device and the portable memory device in a manner similar to embodiments discussed above. In still other embodiments, a password must be entered before or after such authorization.

Further, in some embodiments, the content delivery device will upload electronic information only to the portable memory device, and not any other computer. As such, if the user is using a borrowed computer, such as from a school computer lab, the user's personal or class information will never be saved on that computer, and will not be vulnerable to later access by subsequent users of that computer.

In still another embodiment, the principles discussed herein can be used in a general sales organization context. For example, a consumer may have a detailed set of preferences for types of products. Individual retail outlets, on the other hand, typically have a wide variety of products, much of which is not attractive to any one consumer. However, many such retail outlets will have at least some products that likely would be attractive to the consumer and would fit within the preferences set by such a consumer. In one embodiment, one or more content delivery devices may be provided at a retail store location, and/or at, for example, a mall kiosk. A registered user having certain preferences and an authorized portable memory device can interact with the content delivery device, which will only upload content about stores having products corresponding to that user's particular preferences, which preferences preferably are associated with a profile code on the user's portable memory device. Thus, the user may go to a kiosk, interact with the kiosk, and immediately obtain a specific list of stores to visit and products to review based on the user's known interests and preferences. In some embodiments, a map or suggested visit order may also be provided. Such an embodiment may be particularly effective for portable memory devices having an interface such as a screen, so that the user may take the list, map or the like with them. In other embodiments, the kiosk may have an interface device such as a screen upon which the list or map may be displayed. In yet another embodiment, the kiosk may include a printing device that will print out the list, map or the like. In still further embodiments, the kiosk may output verbal instructions.

In yet another embodiment, the user may temporarily customize his own preferences when looking for a product to satisfy a particular need so that the preferences associated with his profile code are at least temporarily extremely narrow. The user may then interact with the content delivery device that has access to content from retail establishments throughout the corresponding mall or shopping area, and will identify establishments that have products fitting the user's described need, and may even identify particular products that could fulfill that need. Thus, the user, by quickly interacting with the content delivery device, can develop a shortlist of retail establishments to visit in order to efficiently obtain the product for which he is looking, without the hassle of performing individual internet searches. Such an arrangement can also be established in a single store having a broad variety of products. A user looking for a particular class of products can interact with a content delivery device near the entrance of the store, and be immediately guided to the location of the products of interest.

In another embodiment, a network of content delivery devices and registered consumers may be established in which content delivery devices are provided at or near many product displays. Such displays may be in shopping establishments such as malls, showrooms, or the like, but may also be in several other places. For example, a display may be temporarily set up in a public park or other public or private area, an exhibition, fair, or the like. A consumer having an authorized portable memory storage device may, upon being intrigued by a particular product display, interact with the corresponding content delivery device to immediately obtain more information that preferably is customized for their preferences.

The embodiment just discussed may especially benefit from some of the features discussed above such as, for example, a remotely-positioned content delivery device with a wireless-enabled connection that automatically and periodically updates itself In another related embodiment, a handheld computing device such as a smartphone or the like, may be selectively used in connection with content delivery devices. For example, in one embodiment, an application can be downloaded to the computing device upon a user registering as a consumer with the commercial embodiment just discussed. The application preferably is designed to enable selective interaction, preferably by wireless technologies such as Bluetooth, with content delivery devices. More specifically, the user can independently enable or disable communication between her computing device and content delivery devices.

Figure 17:
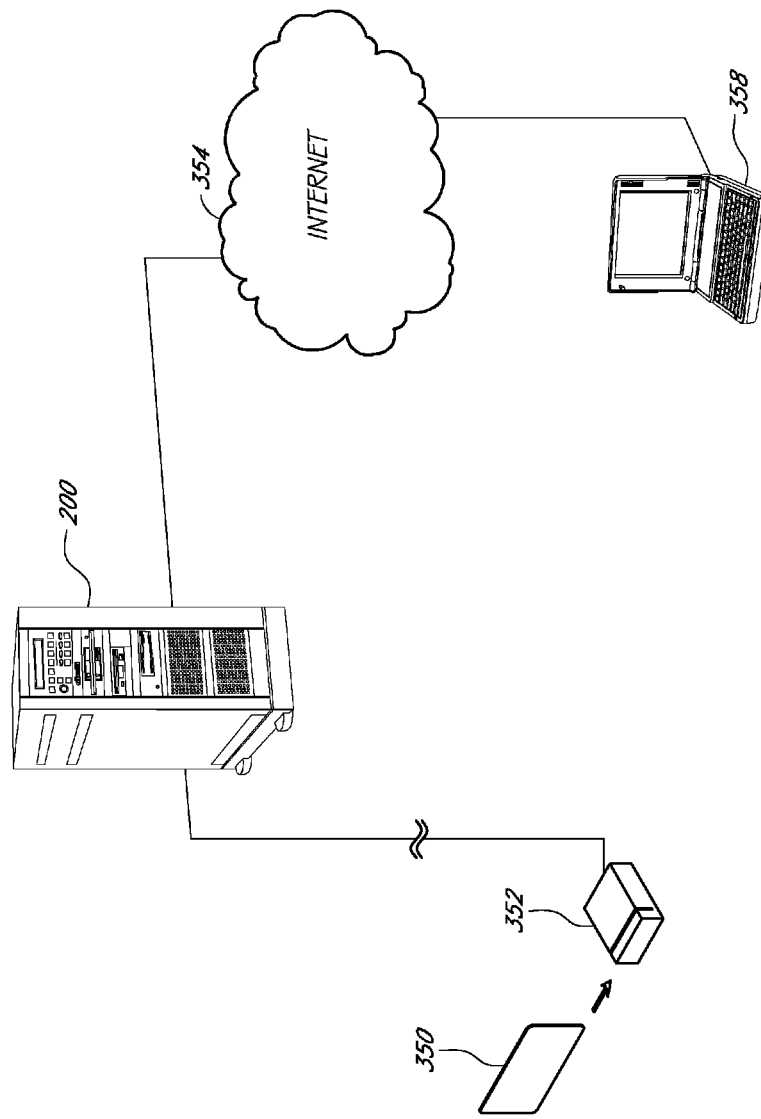
FIG. 17 is a schematic representation of still another embodiment of a system and method for providing electronic content to a user.

With reference next to FIG. 17, another embodiment of a system for data delivery is illustrated schematically. For exemplary purposes this embodiment will be discussed in a trade show context. In this embodiment, rather than a portable memory storage device, an attendee has an identification device 350 on which is saved a code. Each trade show exhibitor has a scanning device 352 corresponding to one or more products. In the illustrated embodiment the identification device 350 is a card, such as a credit card, having a magnetic strip that includes the attendee's identification code, and the scanning device 352 is a card reader. In other embodiments the identification device could be a name tag, card or the like with a bar code, and the scanning device could be a bar code scanner. Other identification devices and scanning devices could also be used.

With continued reference to FIG. 17, preferably an attendee interested in product information associated with a particular scanning device 352 will swipe his card 350. The scanning device 352 will read the attendee's personal code. In one embodiment the code is saved by the scanning device 352 for later transmission to an administrator computer 200. In another embodiment the code is immediately transmitted to an administrator computer 200 without being saved. In either case, either the scanning device 352 additionally transmits a code corresponding to the product content desired by the attendee or the administrator computer 200 determines the desired product content based on the identity of the scanning device 352. By this or another method, the attendee swiping his card has the effect of making the administrator aware that the attendee desires access to the electronic content corresponding to the swiped scanning device.

In one embodiment, as part of the attendee's registration, a web page is created for access only by the associated attendee. By swiping his card 350, the attendee has indicated a desire for certain electronic content associated with a particular product, and the administrator computer 200 will identify both the attendee's personal code and the desired electronic content. The administrator computer 200 then updates the attendee's personal web page to upload files and/or add a link to a web page presenting the electronic content desired by the attendee. Such content preferably is hosted on the internet by the trade show administrator, although it is contemplated that the trade show administrator may contract such web hosting to a third party.

With continued reference to FIG. 17, in order to access the electronic content, the attendee preferably uses his own computing device 358 to access his personal web page via the internet 354. Preferably the attendee's personal web page presents links to electronic content corresponding to the products for which he requested additional information by swiping his card. In one embodiment each link is displayed with a brief explanation or summary that identifies the associated product so as to jog the attendee's memory.

In one embodiment, the personal code is known only to the trade show administrator, and no identifying information about the attendee is provided to the associated exhibitor. In another embodiment, the trade show administrator provides to each exhibitor contact information about the attendee linked with an identification of the product(s) in which the attendee requested information. As such the exhibitors can follow up with trade show contacts.

In another embodiment employing principles just discussed, a network of scanning devices (such as card scanners) and registered consumers may be established in which scanning devices are provided at or near many product displays. Such displays may be in shopping establishments such as malls, showrooms, or the like, but may also be in several other places. For example, a display may be temporarily set up in a public park or other public or private area, an exhibition, fair, or the like. A consumer having a coded identification device such as a swipe card may, upon being intrigued by a particular product display, interact with the corresponding scanning device to indicate a desire for more information that about the display. The scanning device will communicate the code to the network administrator, and the requested information about the display (or a link thereto) will then be added to a web page hosted for that particular consumer by the entity that administers the network. In still another embodiment, communication of the code to the network administrator will trigger generation of an email having customized attachments to the consumer.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. For example, certain features and embodiments have been described in the context of a trade show; other features and embodiments have been described in the context of conventions, formal and informal education, shopping convenience, and general sales organizations. Applicant specifically contemplates that the features associated with particular contexts in this specification are not intended to be used only in that context, but can be mixed and matched. For example, certain features discussed in connection with formal educational embodiments can be employed in general commercial situations, such as for shopping convenience. Also, embodiments discussed herein have referred to content from an exhibitor, teacher, museum or the like being delivered to a trade show attendee, student, visitor, or the like. Generally speaking, features discussed herein will facility content delivery from any first party to any second party. Thus, it is intended that the scope of the present invention herein disclosed should not be limited by the particular disclosed embodiments described above, but should be determined only by a fair reading of the claims that follow.

What is claimed is:

1. A secure system for data delivery, comprising:
   a content delivery device comprising a computer enclosed within a housing;
   a secured access system for the content delivery device, the secured access system configured to prevent unauthorized access to modify electronic files of the computer within the content delivery device, the secured access system comprising an authorization security software routine stored on the computer and configured so that the computer will not execute a command to modify electronic files of the computer or to download any electronic content from an external computer to the content delivery device computer unless requirements of the authorization security software routine are satisfied, and wherein upon satisfying the requirements of the authorization security software routine the external computer may download electronic content to the content delivery device computer;
   a plurality of electronic content files saved in the content delivery device computer;
   a portable electronic memory storage device having a profile code stored therein and having a preferred folder structure saved therein;
   a data delivery interface disposed on the content delivery device and being configured to selectively communicate with the portable electronic memory storage device; and
   software on the content delivery device computer adapted to be triggered when the portable electronic storage device is engaged with the interface port and, upon triggering, to initiate a data delivery routine with the engaged portable electronic storage device;
   wherein the data delivery routine is adapted to identify the profile code stored on the portable electronic memory storage device, determine which of the plurality of electronic content files correspond to the profile code, and upload to the portable electronic memory storage device only the electronic content file or files that correspond to the profile code; and
   wherein the data delivery routine is adapted to identify the preferred folder structure, and the data delivery routine is adapted so that no electronic content files will be uploaded to the portable electronic memory storage device unless and until the preferred folder structure is identified.

2. A system as in claim 1, wherein no data from the portable electronic memory storage device is electronically saved in the memory of the secured content delivery device.

3. A system as in claim 1, wherein an authorization code is stored on the portable electronic memory storage device, and the data delivery routine is adapted to search for and identify the authorization code, and wherein the data delivery routine is adapted so that no electronic content files will be uploaded to the portable electronic memory storage device unless and until the authorization code is identified.

4. A system as in claim 3, wherein the content delivery device comprises a security code and the portable electronic memory storage device includes a security routine configured to read the security code, and wherein the portable memory storage device will not allow electronic content files to be uploaded until the security routine has read the security code.

5. A system as in claim 1, wherein the data delivery routine is adapted to upload one or more of the electronic content files to a selected folder of the preferred folder structure.

6. A system as in claim 3, wherein the content delivery device additionally comprises a setup interface, and wherein the authorization security software routine can be accessed via the setup interface, but not via the delivery interface.

7. A secure system for data delivery, comprising:
   a content delivery device comprising a computer enclosed within a housing;
   a secured access system for the content delivery device, the secured access system configured to prevent unauthorized access to modify electronic files of the computer within the content delivery device, the secured access system comprising an authorization security software routine stored on the computer and configured so that the computer will not execute a command to modify electronic files of the computer or to download any electronic content from an external computer to the content delivery device computer unless requirements of the authorization security software routine are satisfied, and wherein upon satisfying the requirements of the authorization security software routine the external computer may download electronic content to the content delivery device computer;
   a plurality of electronic content files saved in the content delivery device computer;
   a portable electronic memory storage device having a profile code and an authorization code stored therein;
   a data delivery interface disposed on the content delivery device and being configured to selectively communicate with the portable electronic memory storage device; and
   software on the content delivery device computer adapted to be triggered when the portable electronic storage device is engaged with the interface port and, upon triggering, to initiate a data delivery routine with the engaged portable electronic storage device;
   wherein the data delivery routine is adapted to search for and identify the authorization code, and the data delivery routine is adapted so that no electronic content files will be uploaded to the portable electronic memory storage device unless and until the authorization code is identified;
   wherein the data delivery routine is adapted to identify the profile code stored on the portable electronic memory storage device, determine which of the plurality of electronic content files correspond to the profile code, and upload to the portable electronic memory storage device only the electronic content file or files that correspond to the profile code;
   wherein the content delivery device additionally comprises a setup interface, and the authorization security software routine can be accessed via the setup interface, but not via the delivery interface; and wherein the setup interface is disposed within the housing so that a physical barrier is disposed between the setup interface and the outside of the content delivery device housing.

8. A system as in claim 7 additionally comprising a security monitoring system configured to detect attempts to access the content delivery device computer.

9. A secure system for selectively delivering customized electronic data from a first party to a portable electronic memory storage device, comprising:

a content delivery device comprising a computer enclosed within a housing and an interface, the computer comprising a security system configured to limit access to change a setting of the computer and/or to delete or add an electronic file from or to the computer to the administrator computer;

an electronic content file having information concerning a first party, the electronic content file being saved on the content delivery device computer;

a portable electronic memory storage device having an authorization code and a folder structure saved therein, the folder structure having a first party folder, the portable electronic memory storage device configured to communicate with the content delivery device computer via the interface;

wherein the content delivery device computer is configured to read the authorization code of the portable electronic memory storage device and, upon verification of the authorization code, to identify the first party folder and upload the electronic content file to the first party folder of the portable electronic memory storage device; and wherein the content delivery device computer is adapted to not save any data from the portable electronic memory storage device.

10. A system as in claim 9, wherein the system comprises N content delivery devices, each having a computer having an electronic content file having information concerning an Nth party, and the portable electronic memory storage device comprises an Nth party folder, and wherein the Nth content delivery device is configured to identify the Nth party folder and upload the electronic content file to the Nth party folder of the portable electronic memory storage device.

11. A method for delivering content at an event having a plurality of exhibitors, comprising:

providing a plurality of content groups saved on an administrator computer, a first one of the content groups being associated with a first one of the plurality of exhibitors;

providing a plurality of content delivery devices, each content delivery device comprising a unique identification code and a computer enclosed within a housing and having an interface;

providing a plurality of portable electronic memory storage devices each configured to communicate with the content delivery device computers via one of the associated interfaces, the content delivery devices and portable memory storage devices configured so that a content group saved on the content delivery device is automatically loaded onto the portable memory storage device upon interface of the devices;

linking a first one of the content delivery devices to the first one of the content groups when the first one of the plurality of exhibitors checks in to the event, comprising associating the first content group with the unique identification code of the first content delivery device in the administrator computer;

delivering the first content delivery device to the first one of the plurality of exhibitors; and electronically connecting the first content delivery device to the administrator computer;

wherein when the first content delivery device is electronically connected to the administrator computer the administrator computer reads the unique identification code of the first content delivery device, notes that the code is linked to the first content group, and downloads the first content group to the first content delivery device.

12. The method of claim 11 additionally comprising engaging a first one of the portable memory storage devices with the first content delivery device through an interface, and uploading the first content to the first portable device.

13. The method of claim 11, wherein the steps of the administrator computer reading the unique identification code of the first content delivery device, noting that the code is linked to the first content group, and downloading the first content group to the first content delivery device are performed automatically upon electronically connecting the first content delivery device to the administrator computer.

14. The method of claim 11, comprising delivering the first content delivery device to the first one of the plurality of exhibitors before it is electronically connected to the administrator computer.

15. The method of claim 11 additionally comprising the first content delivery device detecting that a first one of the portable memory storage devices is engaged with the first content delivery device through an interface, and uploading the first content from the first content delivery device to the first portable device.

16. The method of claim 11, wherein each of the plurality of portable electronic memory storage devices has a folder structure saved thereon, the folder structure comprising a first and a second folder, and additionally comprising the first content delivery device reading a first one of the plurality of portable memory storage devices that is engaged with the first content delivery device, identifying the first folder, and uploading the first content group to the first folder of the first one of the plurality of portable memory storage devices.

17. The method of claim 16 additionally comprising downloading a second content group from the administrator computer to a second content delivery device, the second content delivery device reading the first one of the plurality of portable memory storage devices that is engaged with the second content delivery device, identifying the second folder, and uploading the second content group to the second folder of the first one of the plurality of portable memory storage devices.

18. The system of claim 5 additionally comprising a second content delivery device having a second computer, a second electronic content file being saved on the second computer, wherein software on the second content delivery device computer is adapted to be triggered when the portable electronic storage device is engaged with an interface port of the second content delivery device and, upon triggering, to initiate a data delivery routine with the engaged portable electronic storage device, wherein the data delivery routine is adapted to identify the preferred folder structure and to upload the second electronic content file to a second folder of the folder structure.

* * * * *